US008290465B2

(12) United States Patent  
Ryu et al.

(10) Patent No.: US 8,290,465 B2
(45) Date of Patent: Oct. 16, 2012

(54) METHOD OF TRANSMITTING AND RECEIVING A MESSAGE ASSOCIATED WITH POWER SAVING MODE IN A WIRELESS COMMUNICATION SYSTEM

(75) Inventors: Ki Seon Ryu, Anyang-si (KR); Yong Ho Kim, Anyang-si (KR); Jeong Ki Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 614 days.

(21) Appl. No.: 12/525,372

(22) PCT Filed: Feb. 1, 2008

(86) PCT No.: PCT/KR2008/000634
§ 371 (c)(1),
(2), (4) Date: Jul. 31, 2009

(87) PCT Pub. No.: WO2008/094017
PCT Pub. Date: Aug. 7, 2008

(65) Prior Publication Data
US 2010/0062725 A1   Mar. 11, 2010

(30) Foreign Application Priority Data

Feb. 2, 2007 (KR) .................. 10-2007-0011130
Feb. 15, 2007 (KR) .................. 10-2007-0015908
Sep. 14, 2007 (KR) .................. 10-2007-0093893

(51) Int. Cl.
*H04B 1/16* (2006.01)
(52) U.S. Cl. .................... 455/343.2; 455/502
(58) Field of Classification Search ........... 455/552.1, 455/574, 343.2, 343.3, 343.4, 450, 502; 370/311, 370/328, 338; 375/354, 260
See application file for complete search history.

(56) References Cited

U.S. PATENT DOCUMENTS
2007/0298778 A1   12/2007  Chion et al.
2009/0042553 A1    2/2009  Lavi FOREIGN PATENT DOCUMENTS
WO  WO-2006/036047      *  4/2006
WO  WO-2006/036047 A2     4/2006
WO  WO-2006/040769 A1     4/2006

(Continued)

OTHER PUBLICATIONS

Yao, Y. et al., "Adaptive Power Saving Strategies for IEEE 802.16e Mobile Broadband Wireless Access", Ln: IEEE Asia-Pacific Conference on Communications, APCC '06, New York: IEEE Aug. 2006, pp. 1-5, XP031024186, ISBN 1-4244-0574-2.*

(Continued)

*Primary Examiner* — Ping Hsieh
(74) *Attorney, Agent, or Firm* — Birch, Stewart, Kolasch & Birch, LLP

(57) ABSTRACT

Disclosed is a sleep mode in a broadband wireless access system, more particularly a method of transmitting and receiving a message associated with a sleep mode in a broadband wireless access system. The method of transmitting a message associated with a sleep mode in a broadband wireless access system includes transmitting a first message which includes a flag if a receiving side receives the first message associated with the sleep mode, the flag indicating that the receiving side transmits an acknowledgement signal to a transmitting side, and receiving the acknowledgement signal from the receiving side which has received the first message.

4 Claims, 27 Drawing Sheets

FOREIGN PATENT DOCUMENTS

| | | |
|---|---|---|
| WO | WO-2006/049460 A1 | 5/2006 |
| WO | WO-2006/071096 A1 | 7/2006 |

OTHER PUBLICATIONS

Yao, Y. et al., "Stufy of UGS Grant Synchronization for 802.16", In: Proceedings of the Ninth international Symposium on Consumer Electronics, ISCE 2005, New York: IEEE, Jun. 14, 2005, pp. 105-110, XP010832126, ISBN 0-7803-8920-4.*

Jang, J. et al., "Adaptive Power Saving Strategies for IEEE 802.16e Mobile Broadband Wireless Access", In: IEEE Asia-Pacific Conference on Communications, APCC '06, New York: IEEE Aug. 2006, pp. 1-5, XP031024186, ISBN 1-4244-0574-2.

Yao, Y. et al., "Study of UGS Grant Synchronization for 802.16", In: Proceedings of the Ninth International Symposium on Consumer Electronics, ISCE 2005, New York: IEEE, Jun. 14, 2005, pp. 105-110, XP010832126, ISBN 0-7803-8920-4.

* cited by examiner

METHOD OF TRANSMITTING AND RECEIVING A MESSAGE ASSOCIATED WITH POWER SAVING MODE IN A WIRELESS COMMUNICATION SYSTEM

TECHNICAL FIELD

The present invention relates to a sleep mode in a broadband wireless access system, and more particularly, to a method of transmitting and receiving a message associated with a sleep mode in a broadband wireless access system.

BACKGROUND ART

A broadband wireless access system based on IEEE802.16 system supports a power saving mode (or saving mode) for minimizing power consumption of a mobile station.

The operation of the mobile station in the power saving mode is performed by repetition of a sleep interval and a listening interval. The length of the sleep interval and the length of the listening interval, which are determined by each value of a sleep window and a listening window, have different values depending on characteristics of traffic set in a corresponding mobile station.

The sleep window and the listening window are parameters defined for the power saving mode. If the parameters including the sleep window and the listening window are defined and the power saving mode is activated depending on the defined parameters, the mobile station performs the power saving operation during the sleep interval defined by the value of the sleep window. In other words, the sleep interval represents the interval defined depending on the sleep window.

The listening interval is defined depending on the value of the listening window, and the mobile station can receive traffic during the listening interval.

Accordingly, the mobile station can have three types of power saving classes as follows depending on characteristics of traffic which is currently set.

Power Saving Mode Class of type 1
Power Saving Mode Class of type 2
Power Saving Mode Class of type 3

The power saving mode class of type 1 targets a best effort (BE) having characteristics of an existing Internet traffic or a non-real-time variable rate (nrt-VR) in which a transmission rate is varied, and is defined by an initial sleep window, a final window base, a final window exponent, a listening window, and a start frame number for sleep window.

The power saving mode class of type 2 targets VoIP or a real-time variable rate (rt-VR) in which a transmission rate is varied, and is defined by an initial sleep window, a listening window, and a start frame number for sleep window.

The power saving mode class of type 3 is for either a management message, such as DCD/UCD and MOB_NBR-ADV, to be periodically forwarded to the mobile station which is in a power saving mode, or data to be forwarded in multicast, and is defined by a final window base, a final window exponent, and a start frame number for sleep window.

The following three messages are basically used for information exchange for the operation of each power saving mode class defined as above.

TABLE 1

| Syntax | Size | Notes |
| --- | --- | --- |
| MOB_SLP-REQ_Message_format( ) { | — | — |
| Management message type = 50 | 8 bits | — |
| Number of Classes | 8 bits | Number of power saving classes. |
| for (i=0; i< Number of Classes; i++) { | — | — |
| Definition | 1 bit | — |
| Operation | 1 bit | — |
| Power_Saving_Class_ID | 6 bits | — |
| If (Operation = 1) | { | — | — |
| Start_frame_number | 6 bits | — |
| Reserved | 2 bits | — |
| } | — | — |
| If (Definition = 1) { | — | — |
| Power_Saving_Class_Type | 2 bits | — |
| Direction | 2 bits | — |
| Traffic_triggered_wakening_flag | 1 bit | — |
| Reserved | 3 bits | — |
| initial-sleep window | 8 bits | — |
| listening-window | 8 bits | — |
| Final-sleep window base | 10 bits | — |
| Final-sleep window exponent | 3 bits | — |
| Number_of_CIDs | 3 bits | — |
| for (i=0; i<Number_of_CIDs; i++ { | — | — |
| CID | 16 bits | — |
| } | — | — |
| } | — | — |
| TLV encoded information | variable | — |
|  | — | — |

Table 1 illustrates an example of MAC management message which is forwarded from the mobile station to a service base station to request a sleep mode which includes a sleep interval and a listening interval.

TABLE 2

| Syntax | Size | Notes |
| --- | --- | --- |
| MOB_SLP-RSP_Message_format( ) { | — | — |
| Management message type = 51 | 8 bits | — |
| Number of Classes | 8 bits | Number of power saving classes. |
| for (i = 0; i < Number_of_Classes; i++) { | — | — |
| Length of Data | 7 bits | — |
| Sleep Approved | 1 bit | — |
| Definition | 1 bit | — |
| Operation | 1 bit | — |
| Power_Saving_Class_ID | 6 bits | — |
| if (Sleep Approved == 1) { | — | — |
| if (Operation = 1) { | — | — |
| Start_frame_number | 6 bits | — |
| Reserved | 2 bits | — |
| } | — | — |

TABLE 2-continued

| Syntax | Size | Notes |
|---|---|---|
| if (Definition = 1) { | — | — |
| Power_Saving_Class_Type | 2 bits | — |
| Direction | 2 bits | — |
| Initial-sleep window | 8 bits | — |
| listening window | 8 bits | — |
| final-sleep window base | 10 bits | — |
| final-sleep window exponent | 3 bits | — |
| TRF-IND required | 1 bit | — |
| Traffic_triggered_wakening_flag | 1 bit | — |
| Reserved | 1 bit | — |
| if (TRF-IND required) { | — | — |
| SLPID | 10 bits | — |
| Reserved | 2 bits | — |
| } | — | — |
| Number_of_CIDs | 4 bits | — |
| for (i = 0; i < Number_of_CIDs; i++) { | — | — |
| CID | 16 bits | — |
| } | — | — |
| if (MDHO or FBSS capability enabled) { | — | If MDHO or FBSS capability is enabled in the REG-REQ/RSP message exchange. |
| Maintain Diversity Set and Anchor BS | 1 bit | — |
| if (Maintain Diversity Set and Anchor BS) { | — | — |
| MDHO/FBSS duration (s) | 3 bits | — |
| } | — | — |
| } | — | — |
| } | — | — |
| Padding | variable | If needed for alignment to byte boundary |
| } else { | — | In case Sleep Approved == 0 |
| REQ-duration | 8 bits | — |
| } | — | — |
| TLV encoded information | variable | — |
| } | — | — |

Table 2 illustrates an example of MAC management message which is forwarded from the service base station to the mobile station to forward sleep mode related information as to whether to accept the sleep mode through sleep response, the sleep interval, the listening interval, and sleep ID.

Table 3 illustrates an example of a broadcast type traffic notification message forwarded at a constant interval. The mobile station of the sleep mode receives the traffic notification message during the listening interval so that it is notified the presence of a downlink traffic forwarded thereto. Then,

TABLE 3

| Syntax | Size | Notes |
|---|---|---|
| MOB_TRF-IND_Message_format( ) | — | — |
| { | | |
| Management message type = 52 | 8 bits | — |
| FMT | 1 bit | — |
| if (FMT == 0) { | — | — |
| SLPID Group Indication bit-map | 32 bits | N-th bit of SLPID-Group indication bit-map MSB corresponds to N = 0] is allo-cated to SLPID Group that includes MS with SLPID values from N*32 to N*32 + 31 Meaning of this bit 0: There is no traffic for all the 32 MS that belong to the SLPID-Group 1: There is traffic for at least one MS in SLPID-Group. |
| Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1 32 bits of Traffic Indication Unit (starting from MSB) are allocated to MS in the ascending order of their SLPID values: 0: Negative indication 1: Positive indication |
| } else { | — | — |
| Num_Pos | 8 bits | Number of CIDs following |
| for (i=0; i<Num_Pos; i++) { | — | — |
| SLPIDs | 10 bits | — |
| } | — | — |
| } | — | — |
| Padding | variable | If needed, for alignment to byte boundary. |
| TLV encoded items | variable | — |
| } | — | — | the mobile station of the sleep mode determines whether to continue to maintain the sleep mode or to receive downlink data after ending the sleep mode.

The operation of each class will be described in detail through the following description of the operation of a technical device according to the related art.

1. Operation of Power Saving Mode Class of Type 1

FIG. 1 is a flow chart illustrating the operation procedure of the power saving mode class of type 1.

In the power saving mode class of type 1, the mobile station requests the base station of conversion to the power saving mode, maintains the power saving mode, and then ends the power saving mode as downlink traffic occurs in the corresponding mobile station.

The operation shown in FIG. 1 will be described as follows.

The mobile station sets values such as initial sleep window, final sleep window, and listening window in a sleep request message (message of Table 1) and forwards the set values to the base station to request conversion to the power saving mode (S101).

If the base station allows conversion to the power saving mode of the corresponding mobile station, the base station forwards a sleep response message (message of Table 2) to the mobile station (S102), wherein values such as initial sleep window, final sleep window, listening window, and initial frame number of sleep window are set in the sleep response message.

If the conversion time to the power saving mode starts, the mobile station maintains a sleep interval equivalent to that of the initial sleep window (S103). In other words, the sleep interval corresponds to the value of the initial sleep window.

If the sleep interval expires, the mobile station receives the traffic notification message (message of Table 3) from the base station for the listening interval preceded by the sleep interval. In case of no downlink traffic toward the mobile station (negative indication), the mobile station maintains the power saving mode for a time period equivalent to twice of the initial sleep window (S104). In other words, the sleep interval corresponds to twice of the value of the initial sleep window.

The sleep interval continues to increase through the following equation (set next sleep window to twice of previous sleep window). The size of the final sleep window is set as follows through final window base and final window exponent which are determined through the sleep response message (message of Table 2) (S105).

final sleep window=final sleep window base*2 final window exponent [Equation 1]

If the mobile station receives the traffic notification message for the listening interval (positive indication), the mobile station ends the power saving mode (S106), wherein the traffic notification message indicates downlink traffic toward the mobile station.

2. Operation of Power Saving Mode Class of Type 2

Hereinafter, the power saving mode class of type 2 will be described.

FIG. 2 is a flow chart illustrating the operation procedure of the power saving mode class of type 2 of a mobile station which is using an unsolicited grant service (UGS) and a real time variable service (RT-VR), wherein the UGS provides one fixed data rate and the real time variable service (RT-VR) provides one real-time variable data rate.

The operation procedure will be described as follows.

The mobile station forwards the sleep request message illustrated in Table 1 to the base station to request definition of power saving mode class parameters (S201).

The base station which has received the sleep request message sets a fixed sleep interval and a fixed listening interval in the sleep response message so as to allow the mobile station to define the power saving mode class parameters (S202).

The mobile station forwards the sleep request message illustrated in Table 1 to the base station to request activation of the power saving mode (S203).

The base station which has received the sleep request message sets a start frame representing a conversion time to the power saving mode in the sleep response message illustrated in Table 2 so as to grant activation of the power saving mode (S204).

The mobile station maintains the power saving mode for a time period equivalent to the sleep interval at the conversion time to the power saving mode (S205).

If the sleep interval expires, the mobile station synchronizes with the base station to maintain uplink/downlink communication with the base station, and receives downlink data from the base station and transmits uplink data to the base station for the listening interval (S206).

If the listening interval expires, the mobile station maintains the power saving mode for the sleep interval to save the power. Afterwards, the mobile station is operated in the power saving mode by repeating the step S204 and the step S205 (S207).

If the mobile station desires to deactivate the power saving mode class, the mobile station forwards a sleep request message representing deactivation of the power saving mode to the base station (S208).

The base station which has received the sleep request message forwards the sleep response message to the mobile station to grant deactivation of the power saving mode (S209).

After inactivating the power saving mode class, the mobile station is normally operated (S210).

3. Operation of Power Saving Mode Class of Type 3

Hereinafter, the power saving mode class of type 3 of the mobile station which is maintained in multicast connection will be described.

FIG. 3 illustrates the power saving mode class of type 3 for reducing power consumption in the mobile station which receives data from the base station through multicast connection.

The base station forwards the sleep response message to the mobile station to allow the mobile station to perform conversion to the power saving mode class of type 3 (S301).

If the conversion time (start frame) to the power saving mode starts, the mobile station which has received the sleep response message maintains the power saving mode for the sleep interval (S302). The sleep interval is determined by the sleep window.

If the sleep interval expires, the mobile station maintains the state capable of performing communication with the base station, and receives data forwarded from the base station through multicast connection (S303).

If the base station forwards all data in a state that multicast connection is maintained, the base station forwards the sleep response message to allow the mobile station to perform conversion to the power saving mode class of type 3, so that the mobile station saves the power until next multicast data are transmitted (S304).

If the conversion time to the power saving mode starts, the mobile station which has received the sleep response message maintains the power saving mode for the sleep interval (S305).

The steps (S303), (S304), and (S305) are repeated (S306).

As described above, the broadband wireless access system supports the power saving mode class per connection according to service type, so as to reduce power consumption of the mobile station.

FIG. 4 illustrates the operation of the power saving mode of the mobile station in which several power saving classes are activated.

In FIG. 4, intervals of unavailability are formed in a region where the sleep intervals are overlapped, and intervals of availability are formed in the other intervals.

In case that a plurality of power saving schemes are used, intervals where sleep intervals according to the respective power saving schemes are overlapped correspond to intervals of unavailability. Also, the other intervals excluding the intervals of unavailability correspond to intervals of availability.

As shown, the mobile station in which several power saving classes are activated temporarily disables uplink/downlink communication with the base station to avoid power consumption for the interval where sleep intervals per class are overlapped.

The power saving mode is operated by the following two steps.

definition of power saving class: there is provided the first step of defining power saving parameters such as sleep window, listening window, sleep ID, and connection identifier. A unique power saving class identifier is assigned depending on the defined power saving class. If there are provided different power saving parameters for one power saving class, different power saving class identifiers are assigned.

There is provided the second step of performing the operation of the power saving class. The operation of the defined power saving class is activated or the operation of the activated power saving class is deactivated.

FIG. 5 illustrates the operation of the mobile station which is in the power saving mode.

To define the power saving class, the mobile station in the normal operation mode forwards the sleep request message to the service base station, wherein the sleep request message includes power saving parameters such as power saving class type, connection direction, initial sleep window, listening window, final sleep window, final sleep window exponent, traffic indicator flag, and connection ID. At this time, a definition field is set to 1 to indicate the sleep request message for defining the power saving class (S501).

The base station which has received the sleep request message forwards the sleep response message to the mobile station (S502), wherein the sleep response message includes power saving parameters such as power saving class type, connection direction, initial sleep window, listening window, final sleep window, final sleep window exponent, traffic indicator flag, sleep ID, and connection ID.

To request conversion to the power saving mode, the mobile station should forward the sleep request message to the base station (S503), wherein the sleep request message includes the operation field set to 1. At this time, the mobile station transmits the sleep request message along with a start time of the power saving mode.

The base station which has received the sleep request message of which operation field is set to 1 forwards the sleep response message to the mobile station, wherein the sleep response message includes the operation field set to 1 and the conversion start time to the power saving mode (S504).

The mobile station which has received the sleep response message is converted into the power saving mode at the start time (S505).

The mobile station does not receive a downlink signal forwarded from the service base station for the sleep interval, which is the unavailable communication time period, to minimize power consumption, and does not transmit uplink traffic to the service base station (S506).

The mobile station can receive downlink data from the service base station and transmit uplink data to the service base station for the listening interval which is the available communication time period (S507).

If the listening interval expires, the mobile station maintains the power saving mode for a time period equivalent to the sleep interval to avoid power consumption (S508).

The mobile station performs transmission and reception of uplink/downlink data with the service base station for the listening interval (S509).

If the mobile station should deactivate the power saving class during the listening interval, the mobile station transmits the sleep request message or a sleep control header to the base station to indicate deactivation of the power saving mode, wherein the sleep request message includes the operation field set to 0 (S510).

The service base station which has received the deactivation request of the power saving mode through the sleep request message or the sleep control header forwards the sleep response message to the mobile station to indicate deactivation of the corresponding power saving class, wherein the sleep response message includes the operation field set to 0 (S511).

The mobile station which has received the sleep response message of which operation field is set to 0 deactivates the corresponding power saving class to end the power saving mode. However, if a plurality of power saving classes are activated, the operation of the corresponding power saving class can only be deactivated (S512).

Although the definition and the operation of the power saving class according to the related art have been described based on the two steps, the mobile station and the base station may define the power saving class and at the same time perform activation of the corresponding power saving class by exchanging the sleep request message and the sleep response message, of which definition field and operation field are simultaneously set to 1.

Furthermore, according to the related art, the base station can activate/deactivate the power saving mode by forwarding the sleep response message or downlink sleep control header message to the mobile station without request of the mobile station.

DISCLOSURE OF THE INVENTION

The present invention is directed to a method of transmitting and receiving a message associated with a sleep mode in a broadband wireless access system, which substantially obviates one or more problems due to limitations and disadvantages of the related art. An object of the present invention is to provide a method of transmitting and receiving a message associated with a sleep mode in a broadband wireless access system, in which power consumption of a mobile station can efficiently be controlled.

According to one aspect of the parent invention, a method of transmitting a message associated with a sleep mode in a broadband wireless access system comprises transmitting a first message including a flag if a receiving side has received the first message associated with the sleep mode, the flag indicating that the receiving side transmits an acknowledgement signal to a transmitting side, and receiving the acknowledgement signal from the receiving side which has received the first message.

According to another aspect of the present invention, a method of transmitting a message associated with a sleep mode in a broadband wireless access system comprises receiving a header message related to resource allocation from a receiving side, the header message including frame latency related information and transmitting a first message associated with the sleep mode, the first message including an offset value determined based on the frame latency related information, wherein the offset value is a value for controlling a start frame of a sleep interval and a listening interval, which are associated with the sleep mode.

According to other aspect of the present invention, a method of transmitting a message associated with a service flow in a broadband wireless access system comprises transmitting a first message requesting the service flow or defining a parameter of the service flow, to a receiving side, the first message including connection identifier representing at least one connection corresponding to the service flow and a power saving mode class identifier for the at least one connection and receiving a second message including the power saving class identifier from the receiving side, wherein the power saving class identifier is allocated from a transmitting side, so that the power saving class identifier is associated with the at least one connection.

It is possible to improve power saving efficiency of a mobile station by efficiently defining control signaling of a power saving mode of the mobile station through the methods suggested in the present invention.

BEST MODE FOR CARRYING OUT THE INVENTION

Hereinafter, detailed operations and features of the present invention will be understood readily by the preferred embodiments of the present invention, examples of which are illustrated in the accompanying drawings.

The embodiment of the present invention is applied to various communication systems which support a power saving mode. Hereinafter, a method suggested by the embodiment of the present invention will be described based on IEEE 802.16 system. To clarify the subject matter of the present invention, description of the related art and technology apparent to those skilled in the art to which the present invention pertains will be omitted.

Hereinafter, the operation of a power saving mode which is to be improved by the embodiment of the present invention will be described.

First of all, the case where a mobile station fails to exactly receive a message transmitted from a base station will be described.

As described above, the mobile station and the base station operate a power saving mode per connection according to service type so as to minimize power consumption of the mobile station.

Figure 1:
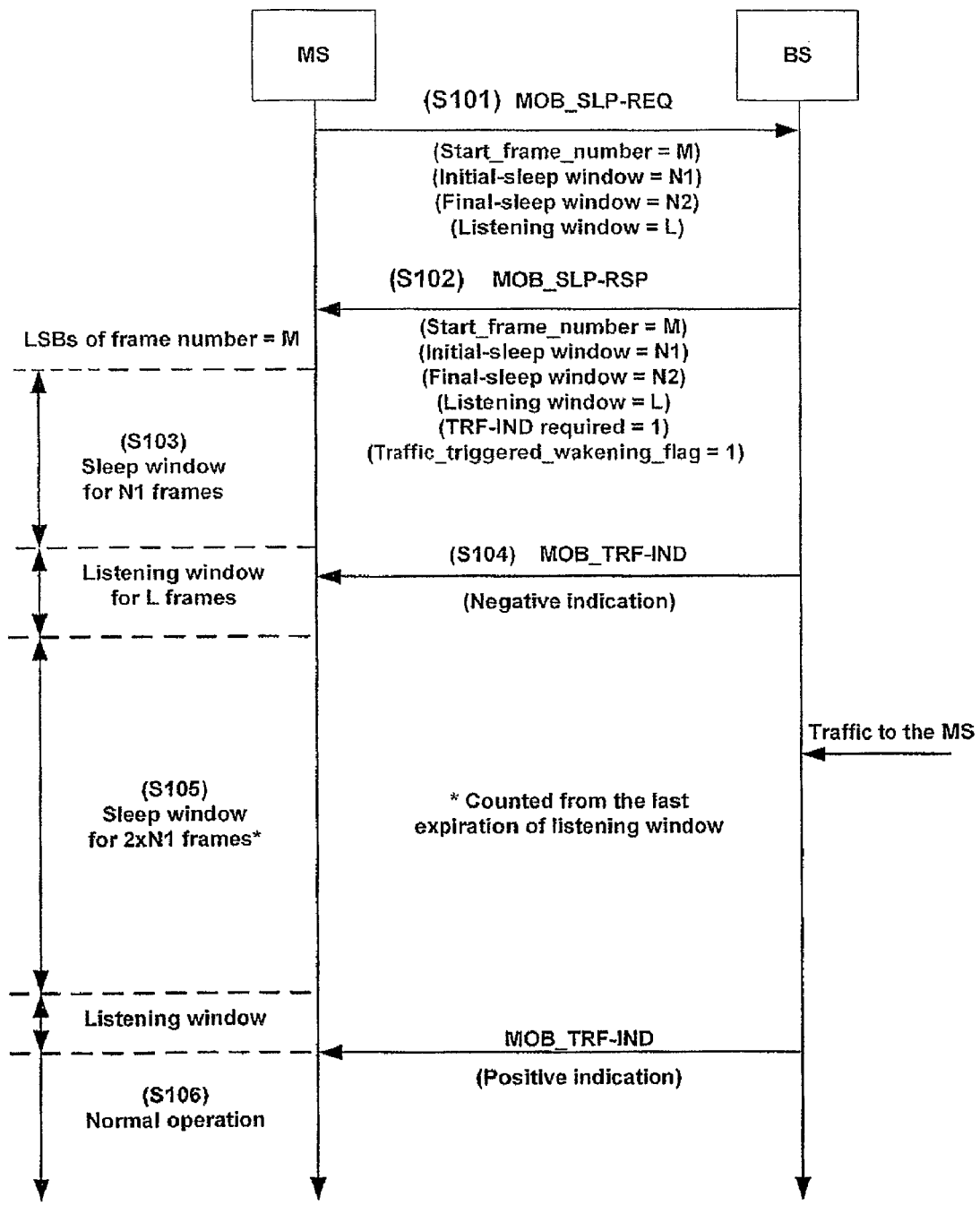
FIG. 1 is a flow chart illustrating the operation procedure of a power saving mode class of type 1.
Figure 2:
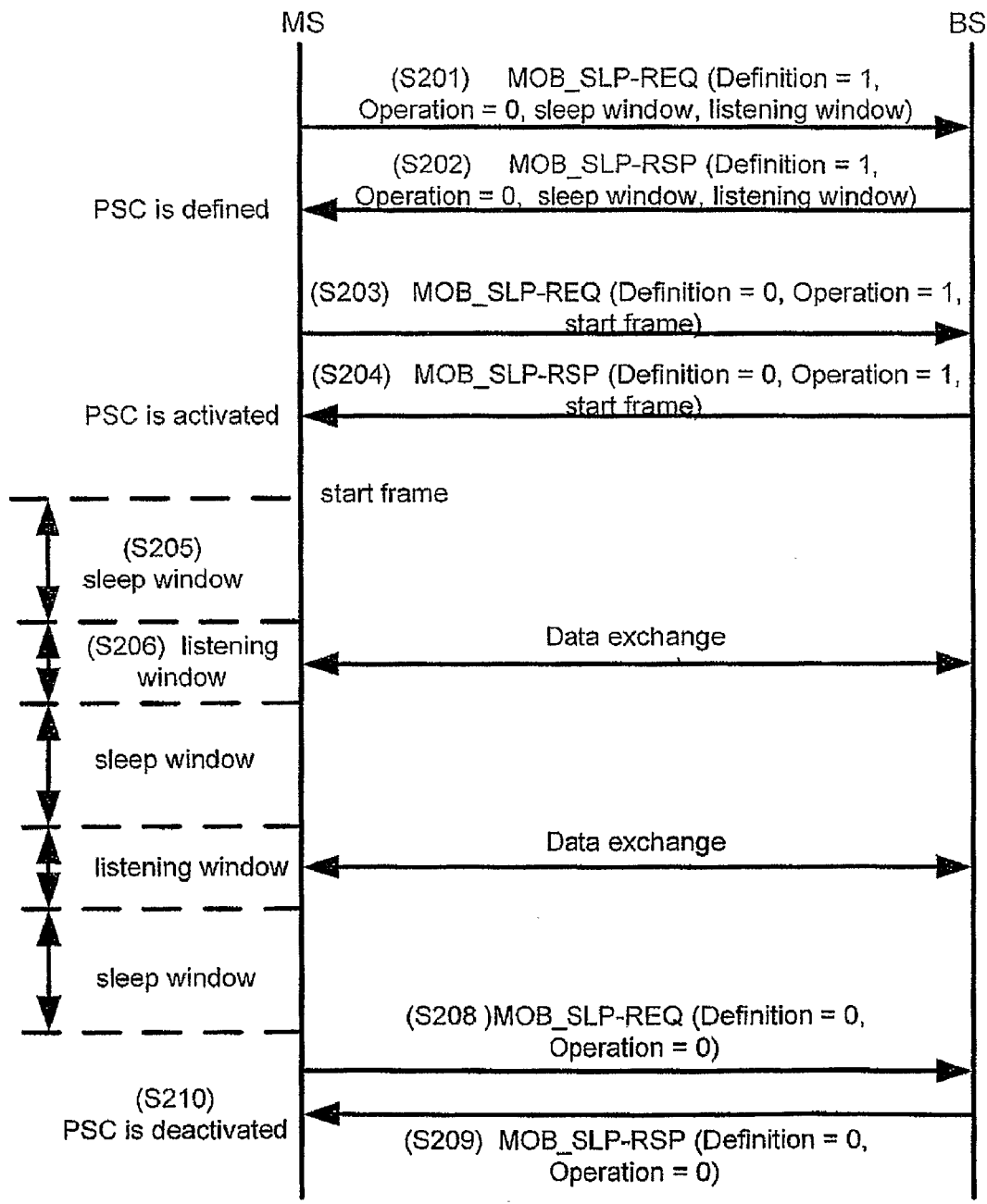
FIG. 2 is a flow chart illustrating the operation procedure of a power saving mode class of type 2 of a mobile station which is using an unsolicited grant service (UGS) and a real time variable service (RT-VR), wherein the UGS provides one fixed data rate and the real time variable service (RT-VR) provides one real-time variable data rate.
Figure 3:
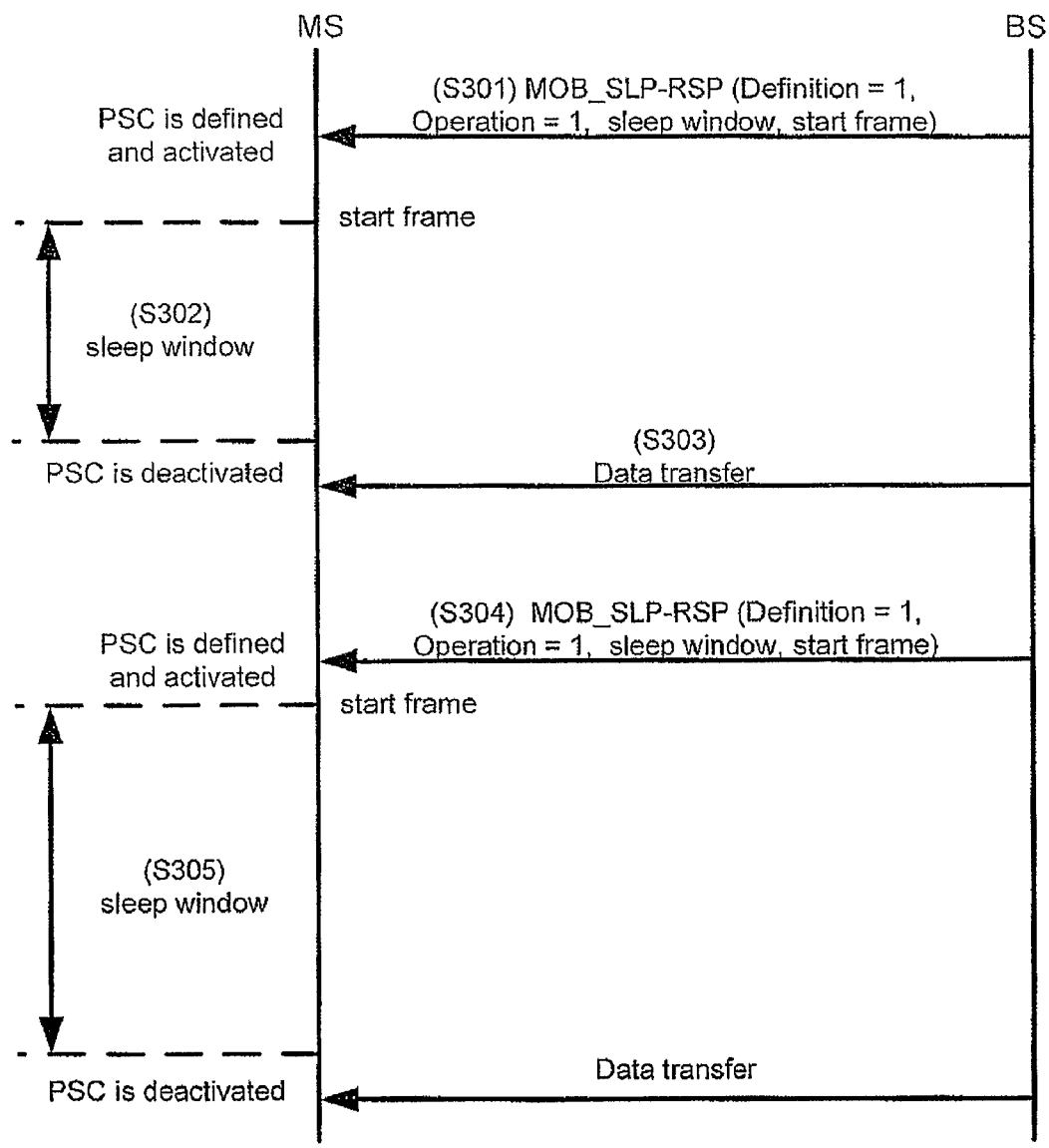
FIG. 3 illustrates the power saving mode class of type 3 for reducing power consumption in a mobile station which receives data from a base station through multicast connection.
Figure 4:
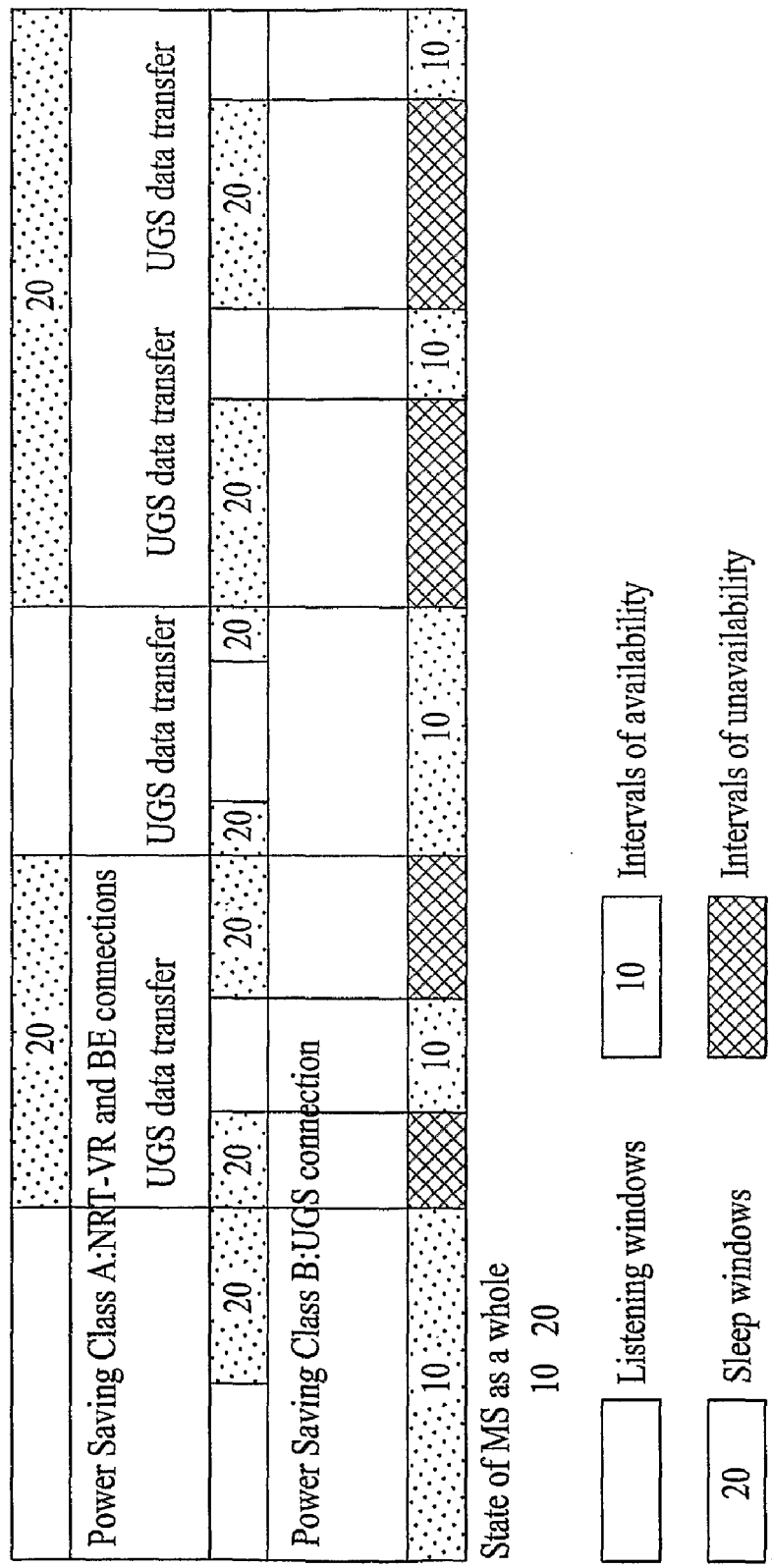
FIG. 4 illustrates the operation of a power saving mode of a mobile station in which several power saving classes are activated.
Figure 5:
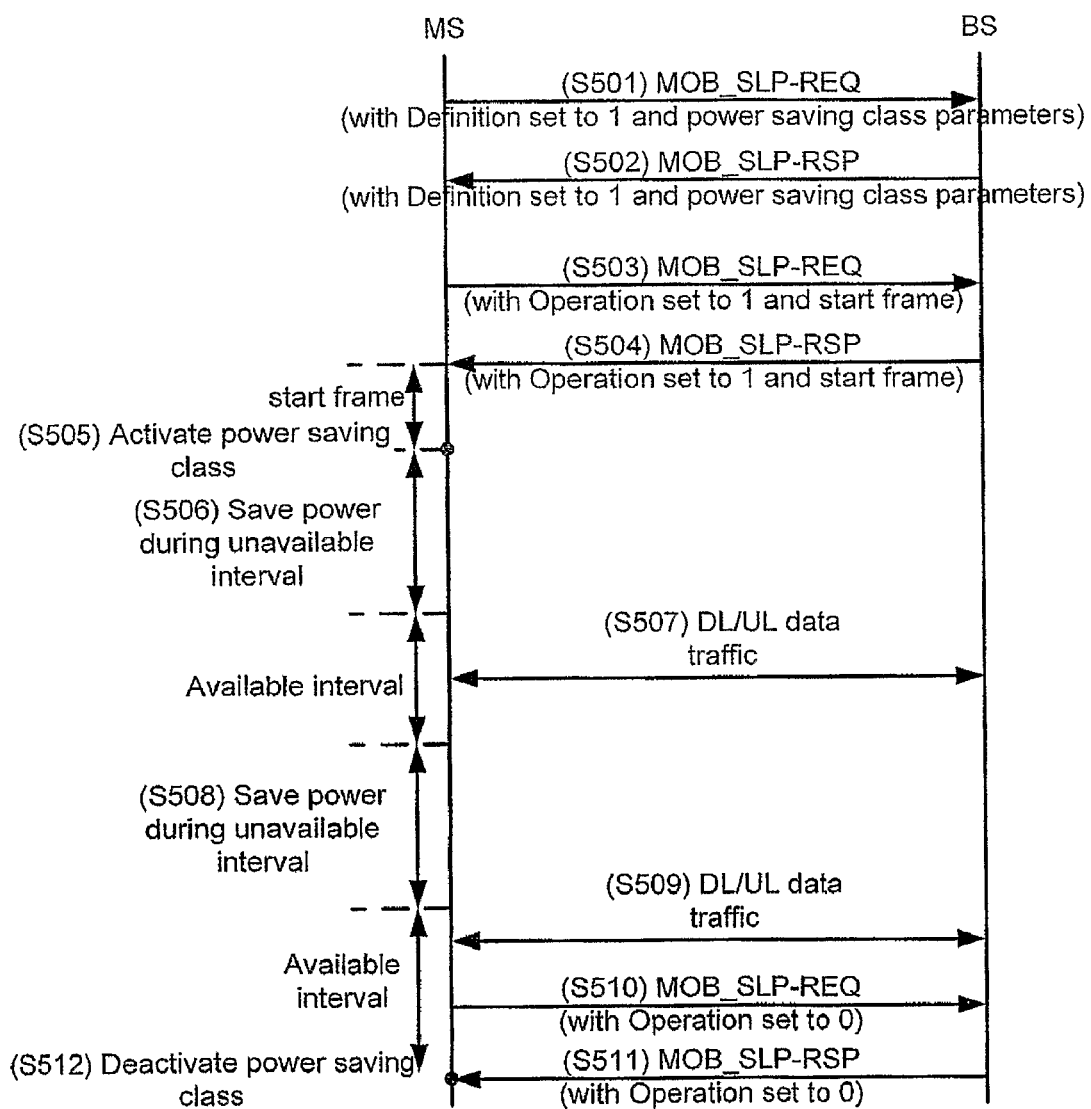
FIG. 5 illustrates the operation of a mobile station which is in a power saving mode.
Figure 6:
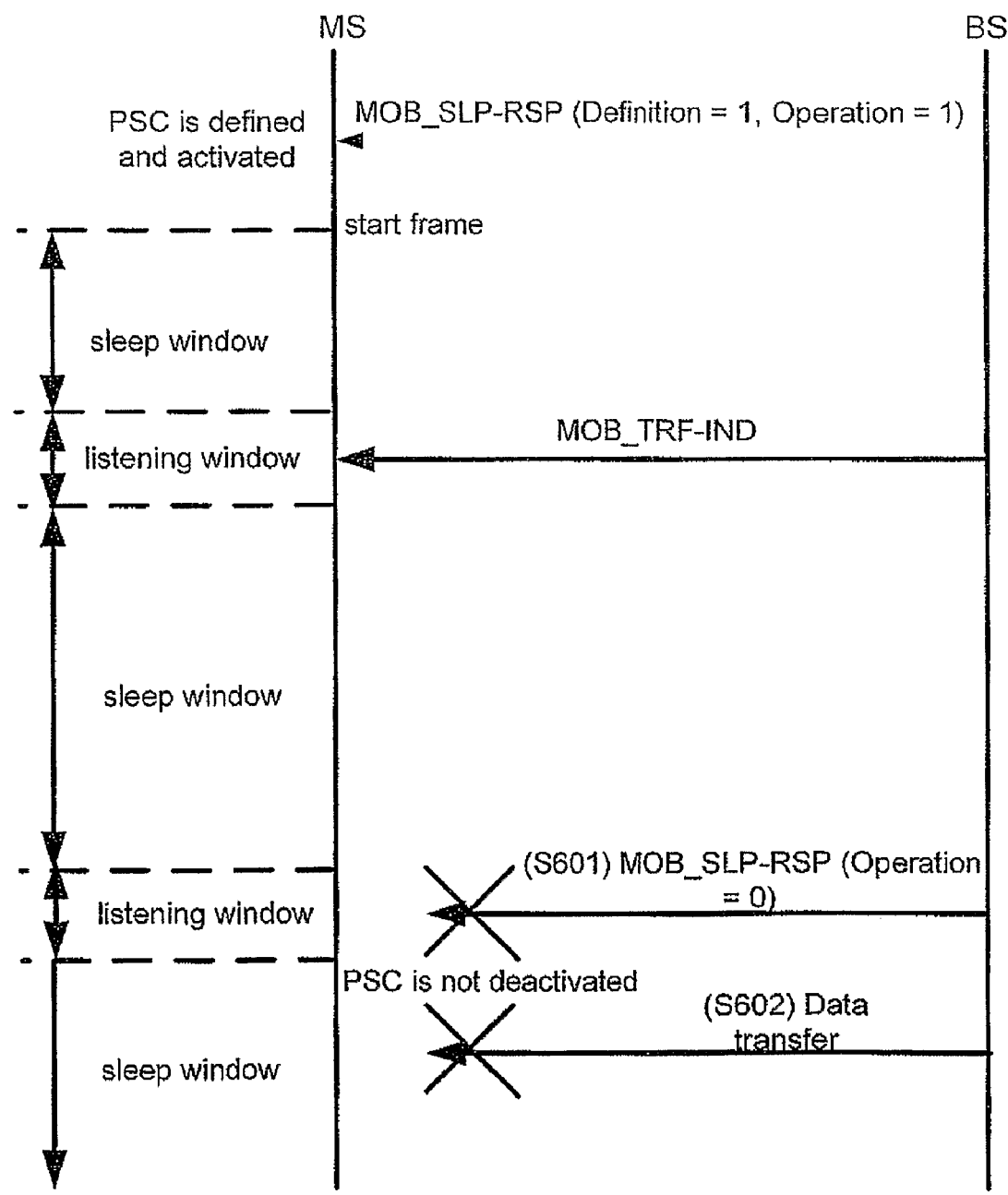
FIG. 6 illustrates a problem that may occur in the power saving mode.

Also, the base station can forward a sleep control message to activate/deactivate a power saving mode without request of the mobile station or redefine parameters. In this case, if the mobile station fails to receive the sleep control message, a problem may occur as shown in FIG. 6. If the sleep control message is lost in a radio channel between the mobile station and the base station, inconsistency of power saving class parameters may occur.

As shown in FIG. 6, the mobile station (MS) may fail to receive a sleep control message (MOB_SLP-RSP) forwarded from the base station (BS) (S601). In this case, configuration information synchronization related to the power saving mode and sleep state synchronization are not maintained between the mobile station and the base station. As a result, the mobile station (MS) may not receive downlink data (S602). This is because that the mobile station (MS) can be located in the sleep interval at the time when the base station (BS) transmits downlink data.

Accordingly, the embodiment of the present invention suggests a method of certainly receiving a sleep control message in a mobile station, wherein the sleep control message is forwarded from a base station without request of the mobile station. Also, the embodiment of the present invention suggests a method of allowing the base station to identify the fact that the mobile station has certainly received the sleep control message.

Hereinafter, a service for allocating resources repeatedly or periodically will be described.

In the related art, there are provided an extended real time polling service, a real time polling service, and an unsolicited grant service, as service types for supporting Voice over IP.

In case of the extended real time polling service and the unsolicited grant service, an allocation timing point of resources periodically allocated to the mobile station can be controlled by using a frame latency indication field (FLI field of Table 4) and a frame latency field (FL field of Table 4) as illustrated in Table 4 below.

TABLE 4

| Syntax | Size | Notes |
|---|---|---|
| Grant Management Subheader { | — | — |
| if (scheduling service type == UGS) { | — | — |
| SI | 1 bit | — |
| PM | 1 bit | — |
| FLI | 1 bit | Frame latency indication |
| | | 0 = Frame latency field disabled for this grant |
| | | 1 = Frame latency field enabled for this grant |

TABLE 4-continued

| Syntax | Size | Notes |
|---|---|---|
| FL | 4 bits | Frame latency<br>The number of frames previous to the current one in which the transmitted data was available.<br>When the latency is greater than 15 then the FL field shall be set to 15. |
| Reserved | 9 bits | Shall be set to zero |
| } else if (scheduling service type == Extended rtPS) { | — | — |
| Extended piggyback request | 11 bits | — |
| FLI | 1 bit | Frame latency indication<br>0 = Frame latency field disabled for this grant<br>1 = Frame latency field enabled for this grant |
| FL | 4 bits | Frame latency<br>The number of frames previous to the current one in which the transmitted data was available.<br>When the latency is greater than 15 then the FL field shall be set to 15. |
| } else{ | — | — |
| Piggyback Request | 16 bits | — |
| } | — | — |
| } | — | — |

For example, if there is latency more than a given time between the time when VoIP packets are generated in the mobile station and the time when resources are allocated from the base station, the field of Table 4 can be used. In other words, the mobile station can request the base station to change the periodical resource allocation timing point for VoIP packet transmission through a frame latency field (FL field) of a resource allocation management subheader as illustrated in Table 4.

Meanwhile, a power saving class having a fixed sleep interval and a fixed listening interval can be defined to support transmission of real-time data such as VoIP traffic in the power saving mode.

Generally, the time when transmission of data traffic such as VoIP is performed is set to a listening interval. If a subheader of Table 4 is used, time latency occurs.

In other words, if the resource allocation timing point for real data transmission is varied using the resource allocation management subheader as illustrated in Table 4, temporal motion of the listening interval and the sleep interval is required. Namely, the step of activating the corresponding power saving class after deactivating the same should be performed, and signaling for this step is required.

This embodiment suggests a method of controlling a start offset value of the sleep interval and the listening interval without deactivating the power saving mode even in case that the periodic resource allocation timing point is varied.

Hereinafter, the operation performed if a service is dynamically added or varied will be described.

The power saving mode sets MAC management connection and data transmission connection belonging to the power saving class through definition of the power saving class, and performs activation and deactivation of the power saving class through the operation of the power saving class.

Figure 7:
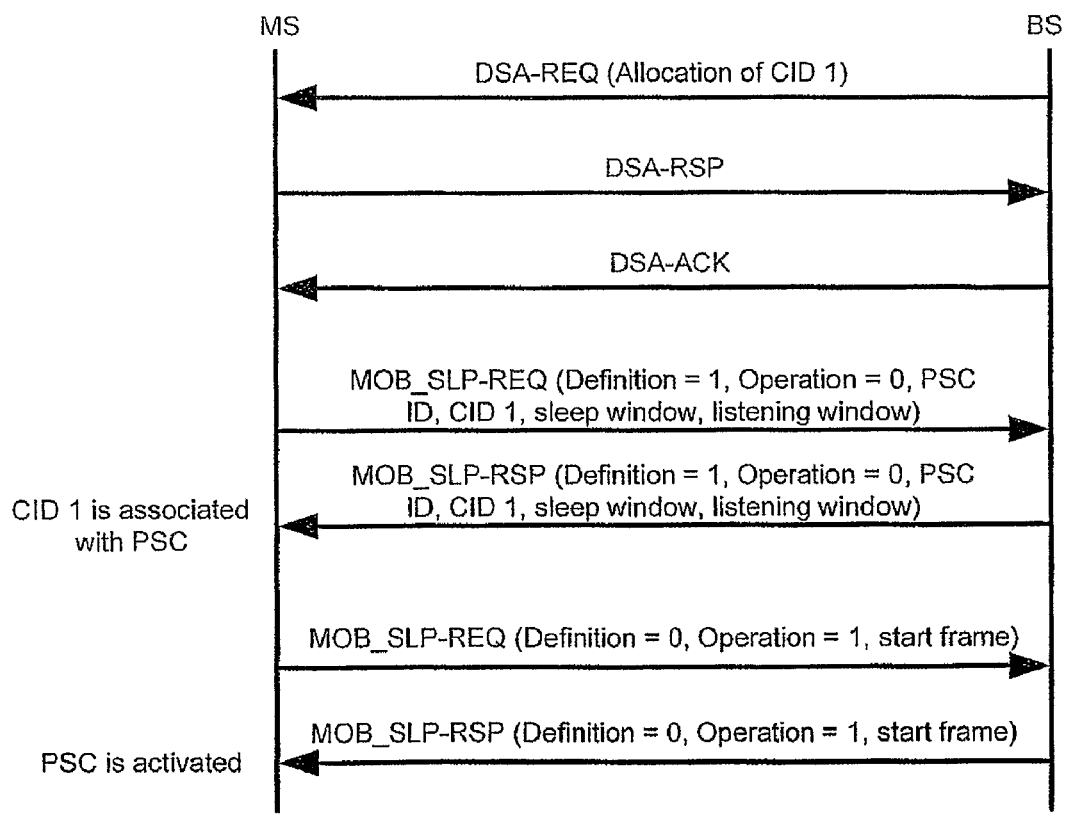
FIG. 7 illustrates a procedure of generating connection for data transmission through generation of a service flow and defining the generated connection for data transmission in a power saving class.

FIG. 7 illustrates a procedure of generating connection for data transmission through generation of a service flow and defining the generated connection for data transmission in the power saving class.

As shown in FIG. 7, if setup of connection is performed through generation of the service flow, message exchange between the sleep request message (MOS_SLP-REQ) and the sleep response message (MOB_SLP-RSP) is performed to define the power saving class.

Also, after the power saving class for connection (each connection is identified by CID) is defined, the corresponding power saving class can be activated.

If a new service flow is generated, the following problem may occur to apply the power saving class to connection corresponding to the service flow.

To define the power saving class for newly generated connection, the sleep request message (MOB_SLP-REQ)/sleep response message (MOB_SLP-RSP) should be exchanged between the mobile station and the base station.

In other words, the procedure of transmitting and receiving a message for defining the power saving class is additionally required.

This embodiment suggests a method for generating a service flow without additional message transmission and reception. In other words, this embodiment is intended to reduce signaling overhead by defining transmission connection allocated in the procedure of generating a service flow without additional message exchange.

The first embodiment of the present invention suggests messages illustrated in Table 5, Table 6, Table 7 and Table 8 to solve the problem occurring in case of FIG. 6.

Hereinafter, an example of an acknowledgment message and a method of transmitting and receiving the acknowledgment message in accordance with the embodiment of the present invention will be described.

Table 5 illustrates an example of an acknowledgment message forwarded from the mobile station to the base station when the mobile station receives a sleep response message from the base station which has not forwarded the sleep request message.

TABLE 5

| Syntax | Size | Notes |
|---|---|---|
| MOB_SLP-ACK_Message_Format( ) {<br>Management Message Type == xx<br>Transaction ID<br>Confirmation Code<br>CMAC Tuple<br>} | <br>8 bits<br>16 bits<br>8 bits<br> | |

Transaction ID: Transaction ID for message synchronization
Confirmation Code: Accept/Reject for MOB_SLP-RSP
CMAC Tuple: code for message authentication Table 6 illustrates an example of SLP-ACK header transmitted for an acknowledgement message from the mobile station to the base station, wherein the mobile station has received a downlink sleep control subheader.

TABLE 6

| Name | Size | Description |
|---|---|---|
| Confirmation Code | 5 bits | An indication if the action specified in the received message will be performed by the MSJ<br>0b00000: Accept<br>0b00001: Reject<br>0b00010-0b11110: Reserved<br>0b11111: Invalid, shall not be set to this value |
| ACK Message Type | 8 bits | The MAC message type of the message received by the MS from the BS |
| Basic CID | 16 bits | The basic CID of the MS |
| HCS | 8 bits | Header Check Sequence (same usage as HCS entry in Table 5). |

Table 7 illustrates an example of the sleep response message (MOB_SLP-RSP) suggested in the present invention.

TABLE 7

| Syntax | Size | Notes |
|---|---|---|
| MOB_SLP-RSP_Message_format( ) { | — | — |
| Management message type = 51 | 8 bits | — |
| Sleep ACK Required | 1 bit | |
| If(Sleep ACK Required == 1) { | | |
| Transaction ID | 16 bits | |
| } | | |
| ... | | |

Sleep ACK Required: field used to transmit an acknowledgement signal to the sleep response message. Namely, this field represents whether the mobile station should transmit the MOB_SLP-ACK message.

After the mobile station transmits the sleep request message (MOB_SLP-REQ), the Sleep ACK Required field can be set to 0 with respect to the sleep response message (MOB_SLP-RSP) which is received from the base station. If the Sleep ACK Required field is set to 0, the mobile station does not need to transmit the MOB_SLP-ACK message.

Table 8 illustrates an example of a parameter used for negotiation as to whether acknowledgment message transmission to the sleep response message forwarded without request between the mobile station and the base station is supported. The corresponding parameter illustrates an example of a parameter exchanged in a network registration procedure. That is, the following parameter is set to '0' or '1' so that the set parameter may be included in a registration request message (REG-REQ) and a registration response message (REG-RSP).

TABLE 8

| Type | Length | Value | Scope |
|---|---|---|---|
| xxx | 1 | 0: No acknowledgement for unsolicited MOB_SLP-RSP message support<br>1: Acknowledgement for unsolicited MOB_SLP-RSP message support | REG-REQ<br>REG-RSP |

Figure 8:
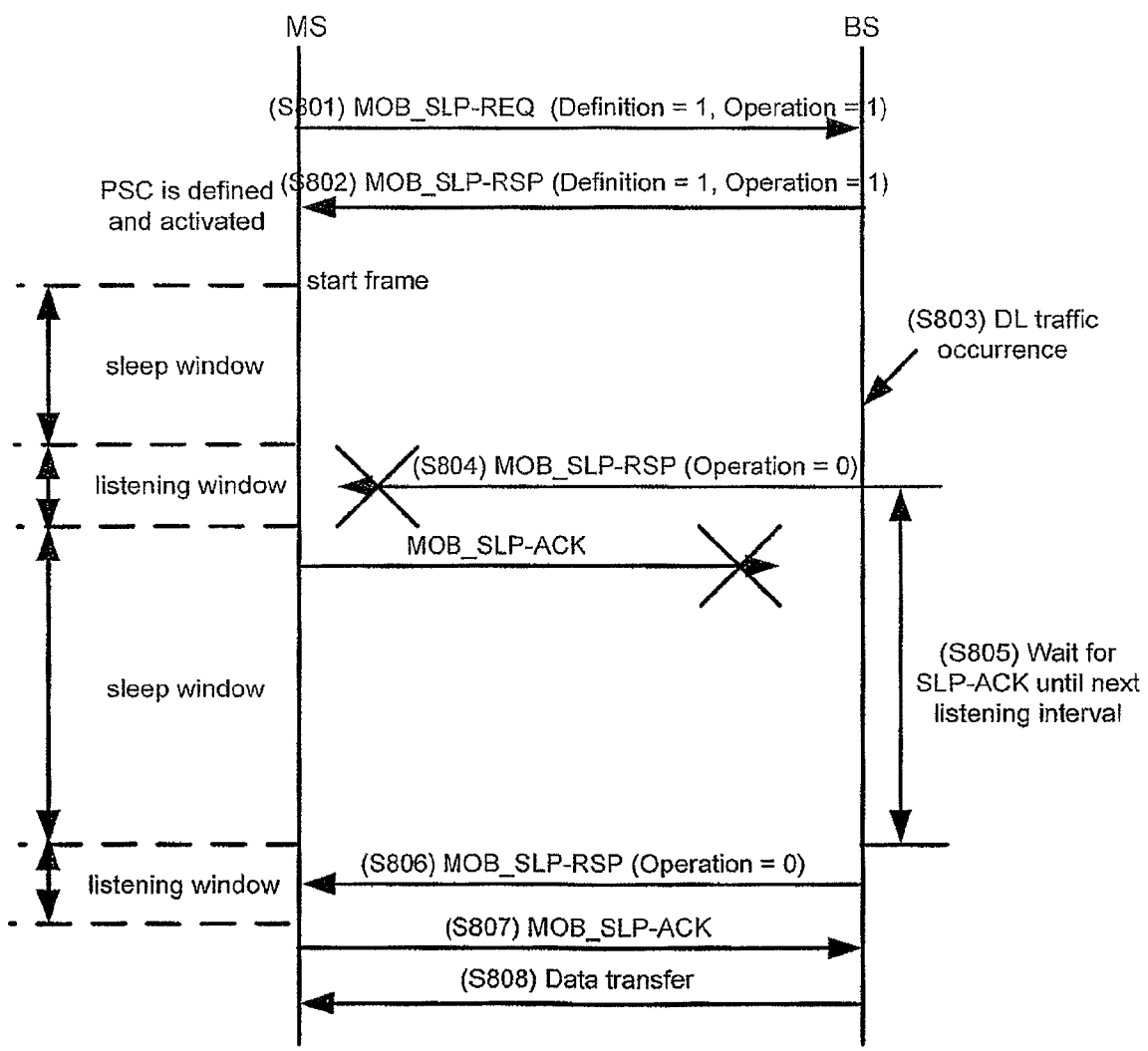
FIG. 8 to FIG. 27 are flow charts illustrating embodiments of the present invention.

FIG. 8 illustrates the operation of the mobile station which transmits an acknowledgment message to the sleep response message received from the base station.

(S801) The mobile station and the base station can request definition and activation of the parameter of the power saving class by transmitting the sleep request message (MOB_SLP-REQ) to the base station.

(S802) The base station which has received the sleep request message approves the request for definition and activation of the parameter of the power saving class by transmitting the sleep response message (MOB_SLP-RSP) to the mobile station. The mobile station which has received the sleep response message is operated in the power saving mode in accordance with the sleep window and the listening window which are defined in the power saving class.

(S803) If the power saving class of the mobile station needs to be deactivated on the ground that downlink traffic occurs in the mobile station, (S804) the base station commands the mobile station to perform deactivation of the power saving class through the sleep response message or the control message of the downlink sleep control subheader.

(S805) After transmitting the sleep response message, the base station waits for reception of a sleep acknowledgement message (SLP-ACK) from the mobile station. If the mobile station fails to receive the sleep response message, or if the sleep acknowledgement message transmitted from the mobile station is lost, the base station may fail to receive the sleep acknowledgement message within the sleep interval.

(S806) If the base station fails to receive the sleep acknowledgement message (SLP-ACK) from the mobile station, the base station retransmits the sleep response message during the next listening interval and waits for reception of the sleep acknowledgement message.

(S807) The mobile station which has received the sleep response message from the base station notifies that the sleep response message has been received by transmitting the sleep acknowledgement message or uplink sleep acknowledgement header as illustrated in Table 5 or Table 6 to the base station.

(S808) If the base station acknowledges that the power saving class of the mobile station has been deactivated, by receiving the sleep acknowledgement message or the uplink sleep acknowledgement header, the base station transmits downlink data, which is being buffered, to the mobile station.

In the aforementioned embodiment, the mobile station can negotiate whether to support the sleep acknowledgement message by exchanging a parameter for negotiating whether to support the sleep acknowledgement message illustrated in Table 8 with the base station in the initial registration procedure. Also, in the steps S804 and S806, the base station can command the mobile station whether to transmit the sleep acknowledgement message through the sleep response message or the downlink sleep control subheader as illustrated in Table 6. Namely, if sleep acknowledgement is required, the base station sets the sleep acknowledgement field to 1 and then forwards the set sleep acknowledgement field to the mobile station, so that the mobile station can transmit the sleep acknowledgement message or the uplink sleep acknowledgement header.

Hereinafter, a method for efficiently transmitting data such as VoIP packets generated during the sleep interval will be described.

The second embodiment of the present invention suggests a parameter of Table 9 below.

Table 9 illustrates an example of a parameter that can be included in the sleep response message to control start offset of the sleep interval and the listening interval.

TABLE 9

| Type | Length | Value | Scope |
|---|---|---|---|
| xxx | 2 | Least Significant Bit(LSB) of the frame number which the next listening window starts. | MOB_SLP-RSP |

Figure 9:
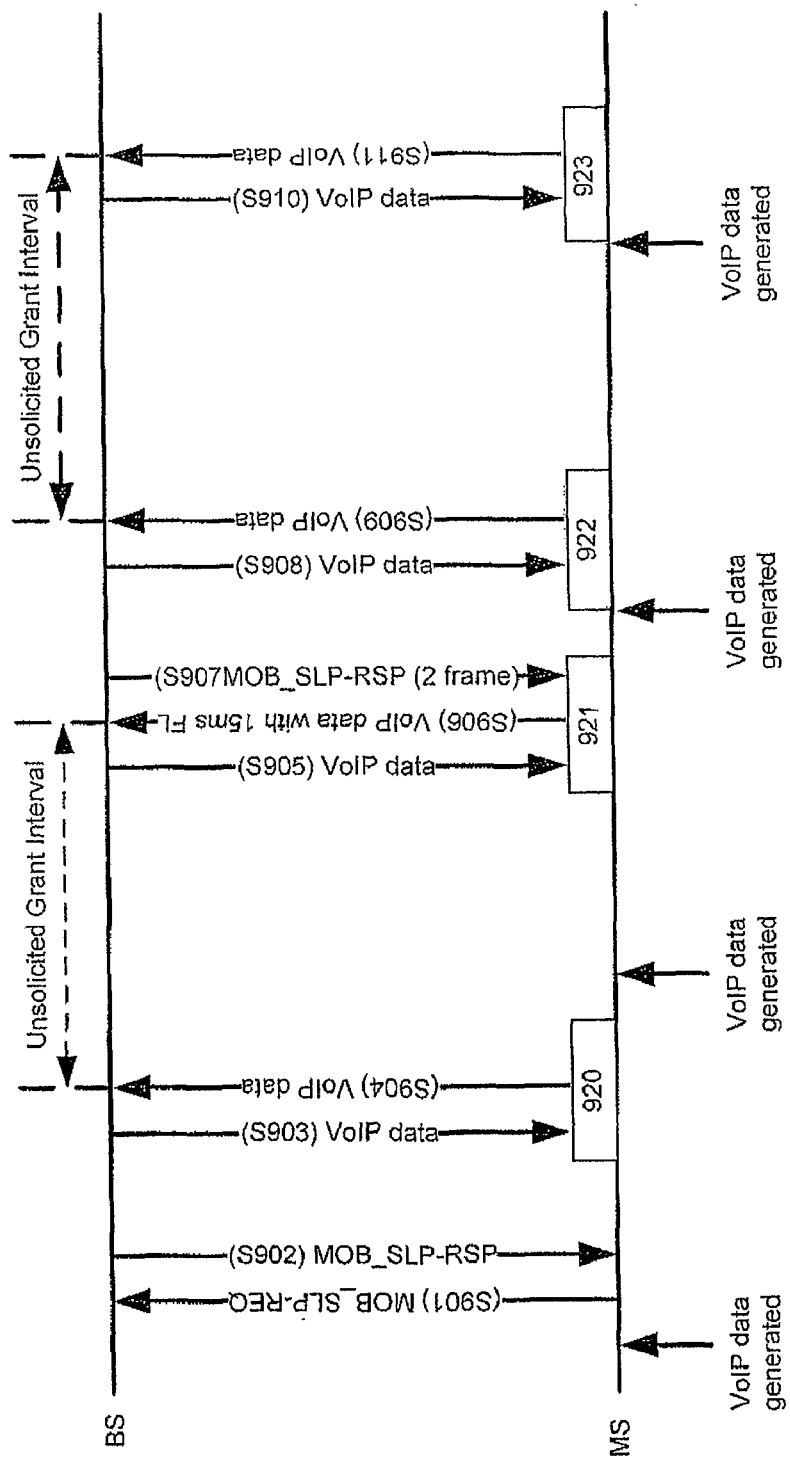

FIG. 9 illustrates the operation of the power saving class used to transmit real-time traffic such as VoIP data in accordance with the second embodiment of the present invention.

(S901) In case of real-time traffic such as VoIP data, the base station is allocated with resources for periodical data transmission and reception of the mobile station. It is preferable that the power saving class for supporting the resource allocation has a fixed sleep window and a fixed listening window considering periodical data transmission and reception. The mobile station can request definition of the sleep window and the listening window and activation of the corresponding power saving class through the sleep request message (MOB_SLP-REQ).

(S902) The base station which has received the sleep request message from the mobile station approves definition and activation of the power saving class by transmitting the sleep response message (MOB_SLP-RSP) to the mobile station.

(S903) The mobile station in which the power saving class is activated is operated in the power saving mode during the sleep interval and receives data transmitted from the base station during the listening interval 920.

(S904) The mobile station transmits data to the base station by using uplink resources allocated from the base station during the listening interval 920. If the listening interval ends, the mobile station maintains the power saving mode during the next sleep interval. The base station allocates uplink resources for VoIP traffic in accordance with a period given by an unsolicited resource allocation interval parameter.

(S905) The mobile station receives downlink data during the listening interval 921.

(S906) The mobile station transmits uplink data to the base station by using the allocated uplink resources. If there is a great latency between the uplink allocation period and the time when VoIP packets of the mobile station are generated, the mobile station can request change of the resource allocation timing point by using the uplink resource allocation header as illustrated in Table 4.

In more detail, if a latency value between the time when VoIP packets are generated and the listening interval 921 occurs, a start point of the listening interval of the base station can be controlled through the FL field included in Table 4. Preferably, the start point of the listening interval can be controlled depending on the FL field value transmitted from the mobile station, or the start point of the listening interval can be controlled depending on determination of the base station.

(S907) The base station can notify the mobile station of change of a start point of the listening interval and the sleep interval by using the parameter illustrated in Table 9. The mobile station which has received the parameter representing change of the start point of the listening interval and the sleep interval from the base station can identify the change of the start point by selectively transmitting the sleep acknowledgement message (SLP-ACIK) to the base station.

(S908) The mobile station receives downlink data transmitted from the base station during the listening interval at the changed start point of the listening interval 922.

(S909) The mobile station transmits uplink data to the base station by using uplink resources allocated from the base station during the listening interval. If the listening interval ends, the mobile station is operated in the power saving mode during the sleep interval.

(S910) The mobile station receives downlink data during the listening interval.

(S911) The mobile station transmits uplink data to the base station by using the allocated uplink resources during the listening interval 923.

FIG. 9 illustrates a method of solving a problem due to latency between the time when VoIP packets of the mobile station are generated and the resource allocation timing point. In more detail, if the resource allocation timing point is changed, the problem caused by inconsistency of the sleep interval/listening interval and real data transmission and reception time is solved.

This embodiment suggests a method of allowing the base station to change a start point of the listening interval to the time when real resources are allocated by using the parameter of the sleep control message.

As another possible method, there is provided a method of controlling the reactivation time of the power saving class considering the time when real resources are allocated from the base station after the power saving class is deactivated.

Hereinafter, a method of omitting signaling in the procedure of generating or changing a service flow will be described.

The third embodiment of the present invention suggests the following parameter.

Table 10 illustrates an example of a parameter for defining transmission connection in the power saving class by being included in a dynamic service flow generating and changing message.

TABLE 10

| Type | Length | Value | Scope |
| --- | --- | --- | --- |
| xxx | 2 | Power Saving Class Identifier | DSA-REQ |
| | | | DSA-RSP |
| | | | DSC-REQ |
| | | | DSC-RSP |

Figure 10:
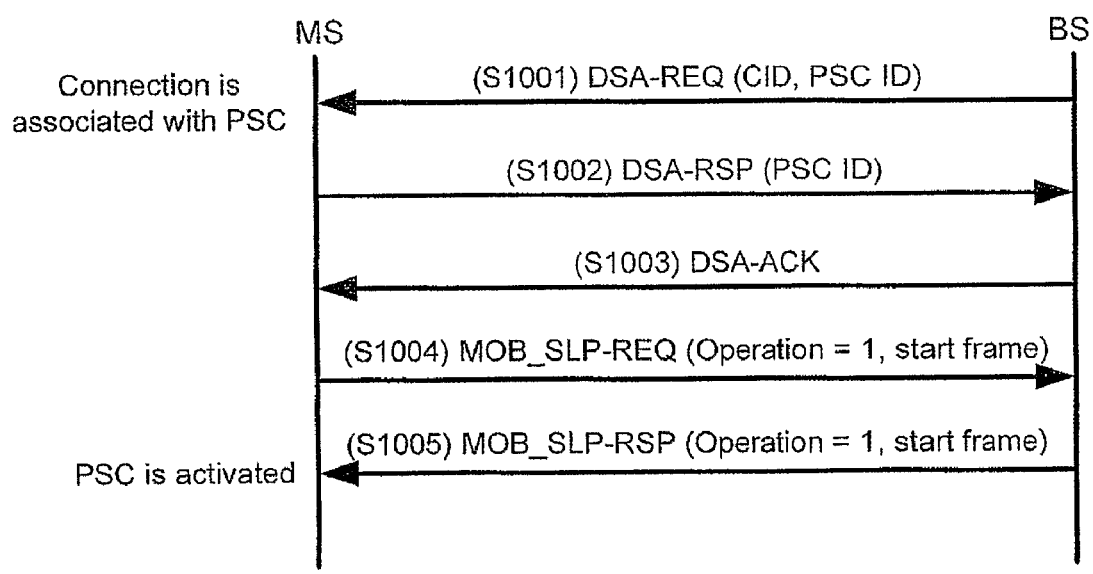

FIG. 10 illustrates a method of defining a power saving class with respect to connection allocated in the procedure of generating a service flow.

(S1001) The base station can define parameters of a service flow and connection setup of a new service flow by forwarding a dynamic service addition request (DSA-REQ) message to the mobile station. At this time, in order to allocate power saving class ID for corresponding connection, the dynamic service addition request message can include the power saving class identifier illustrated in Table 10.

Preferably, the power saving class identifier is previously defined. If the power saving class identifier is previously defined, connection can be associated with the power saving class without separately transmitting the listening interval and the sleep interval.

If the power saving class identifier and connection identifier (CID), which are allocated from the base station, are forwarded to the mobile station, the corresponding connection identifier is associated with the power saving class identified by the power saving class identifier.

(S1002) The mobile station which has received the dynamic service addition request message from the base station performs parameter setup of a new service flow, defines corresponding connection of the allocated power saving class identifier in the power saving class, and transmits a dynamic service addition response message to the base station.

(S1003) The base station which has received the dynamic service addition response message transmits the dynamic service addition acknowledgement message to the mobile station.

(S1004) To activate the power saving class which includes newly allocated connection, the mobile station transmits the sleep request message to the base station.

(S1005) The base station which has received the sleep request message requesting activation of the power saving class approves activation of the power saving class by transmitting the sleep response message to the corresponding mobile station. The mobile station which has received the sleep response message activates the corresponding power saving class at the activation time.

Although the base station has transmitted the dynamic service addition request message in the example of FIG. 10, the mobile station may selectively transmit the dynamic service addition request message, and the base station may transmit the dynamic service addition response message to the mobile station in response to the dynamic service addition request message. In this case, the power saving class identifier is included in the dynamic service addition request message and the dynamic service addition response message, so that the power saving class can be defined for newly allocated connection.

Figure 11:
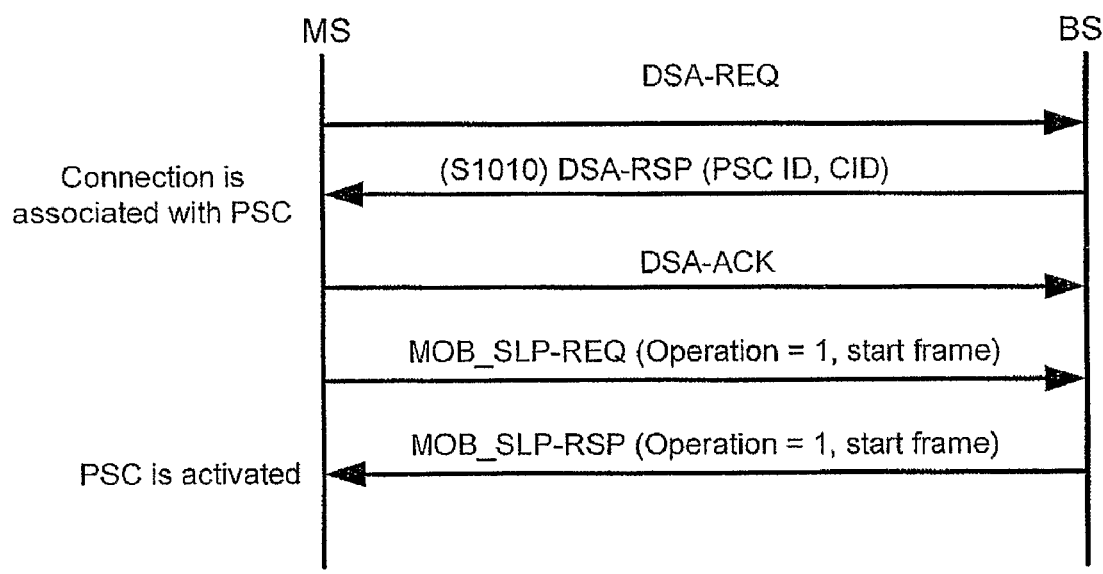

In other words, if the dynamic service addition request message (DSA-REQ) is initiated by the mobile station not the base station, the procedure of FIG. 11 can be performed. As shown, the DSA initiated by the mobile station (SS-initiated DSA) can include the power saving class identifier and connection identifier in the dynamic service addition response message (DSA-RSP) transmitted from the base station (S1010).

Also, the step S1001 can be improved in the example of FIG. 10. The steps S1004 and S1005 are performed for activation of the power saving class in the procedure of FIG. 10. If information of the start frame forwarded through the steps S1004 and S1005 is provided in the previous step, it is not necessary to separately perform activation of the power saving class.

Figure 12:
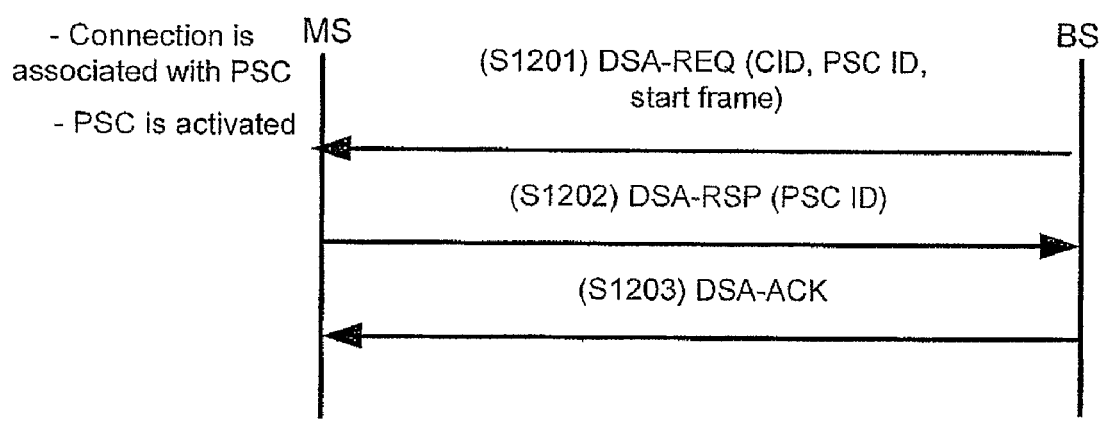

The aforementioned description is as illustrated in FIG. 12.

Figure 13:
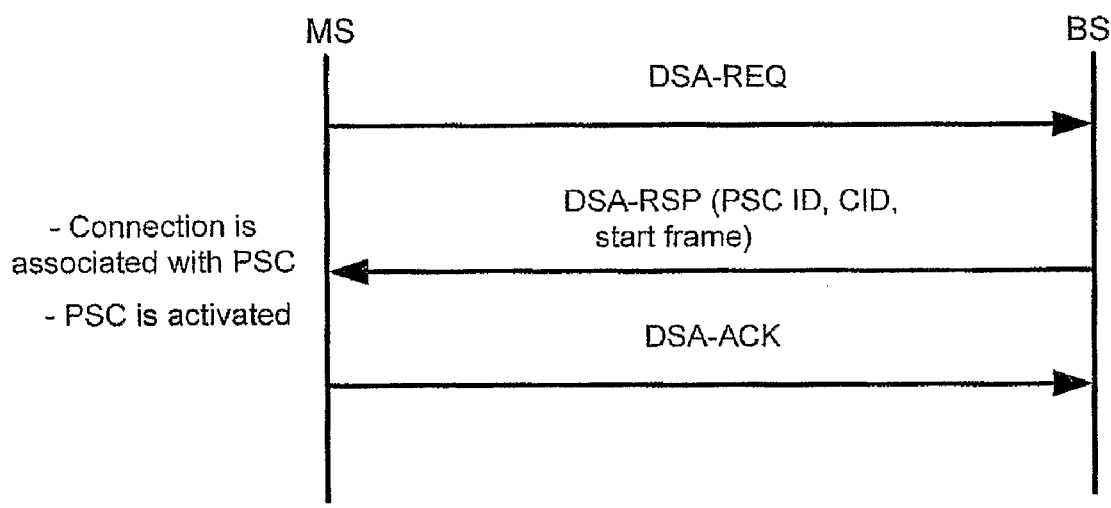

Also, the activation step of the power saving class, which is performed in the example of FIG. 11, may be omitted. An example of improving the example of FIG. 11 is as illustrated in FIG. 13.

Instead of the dynamic service request message (DSA-REQ), the dynamic service change request (DSC-REQ) message may be used. In this case, the dynamic service change request/response messages (DSC-REQ/RSP) are used together.

The power saving class identifier is included in the dynamic service change request (DSC-REQ) message which changes the parameter of the service flow and the dynamic service change response (DSC-RSP) message, so that the power saving class for the previously allocated connection may be changed or a new power saving class for the changed connection may be defined.

Hereinafter, the fourth embodiment of the present invention will be described.

The fourth embodiment of the present invention relates to a method of continuing normal communication between the mobile station and the base station even in case that a message related to the power saving class is lost.

The following embodiment has suggested a method of tracking and updating change status of the power saving class parameters to prevent inconsistency of the power saving class parameters due to loss of the sleep control message between the mobile station and the base station.

The base station transmits the sleep response message which includes a PSC change count. The mobile station which has received the sleep response message can identify whether the power saving class has been changed by comparing the PSC change count included in the sleep response message with its PSC change count, and is properly operated in accordance with the identified result and a flag included the message.

When the mobile station which has received the sleep response message for activation of the power saving class without definition or re-definition of the power saving class identifies that the PSC change count in the sleep response message is different from its PSC change count, the mobile station transmits a sleep report message in respect of the power saving class to notify the base station of the difference. The base station which has received the sleep report message transmits the sleep response message to re-define the power saving class designated in the sleep report message.

Furthermore, the base station transmits a sleep count request message (MOB_SLP-CREQ) to the mobile station to identify whether the mobile station is operated using a right power saving class parameter. The mobile station which has received the sleep count request message transmits a sleep count response message which includes a PSC change count of power saving class ID included in the sleep count request message. The base station which has received the sleep count response message compares the PSC change count included in the sleep count response message with a PSC change count stored therein. If the PSC change count included in the sleep count response message is the same as the PSC change count stored in the base station, the base station determines that the mobile station is normally operated, and maintains the current status. If the PSC change count included in the sleep count response message is different from the PSC change count stored in the base station, the base station determines that the mobile station and the base station have different power saving class parameters, and transmits the sleep response message (MOB_SLP-RSP) to the mobile station, for redefinition.

If the base station transmits the sleep response message for redefinition and activation in a state that the power saving class is activated, the base station can transmit a sleep count request message during a listening interval corresponding to a specific listening window of the power saving class. Preferably, the base station can transmit the sleep count request message during a listening interval corresponding to a first listening window.

Hereinafter, the example of a message suggested or varied in the fourth embodiment will be described with reference to Table 11 to Table 14.

Table 11 illustrates an example of the sleep response message (MOB_SLP-RSP) suggested in the present invention. The sleep response message includes a PSC change count.

TABLE 11

| Syntax | Size | Notes |
|---|---|---|
| MOB_SLP-RSP_Message_format( ) { | — | — |
| Management message type = 51 | 8 bits | — |
| Number of Classes | 8 bits | |
| For (i=0; i< Number_of_Classes; i++) { | — | |
| Length of Data | 7 bits | |
| Sleep Approved | 1 bit | |
| Definition | 1 bit | |
| Operation | 1 bit | |
| Power_Saving_Class_ID | 6 bits | |
| PSC Change Count | 8 bits | |
| If(Sleep Approved == 1) { | | |
| . . . | | |

PSC change count: Preferably, when a parameter value of a designated class is changed, the PSC change count is increased by 1 (modulo 256).

The PSC change count can be increased or reduced from a specific number. For example, when the PSC change count is newly defined, it is set to 0. If a definition field value related to PSC definition in the message is equal to 1 and the PSCH change count value is different from a previous value, the mobile station determines that parameters for the class are newly defined, and changes the stored count value to a new value included in the sleep response message.

If the definition field value is equal to 0 and the count value is different from the stored count value, the mobile station determines that a message for redefinition of the PSC has not been received. To notify the base station of the fact that the message for redefinition of the PSC has not been received, the mobile station transmits the sleep report message (MOB_SLP-REP) to the base station. If the PSC change count value included in the message received from the mobile station is different from the PSC change count value stored in the base station, the base station transmits the sleep response message (MOB_SLP-RSP) for redefinition to the mobile station.

Table 12 illustrates an example of a sleep report message (MOB_SLP-REP) having a definition field value of 0 and indicating that the mobile station which has received the sleep response message (MOB_SLP-RSP) requests the base station to redefine a specific class, wherein the sleep response message (MOB_SLP-RSP) includes PSC change count different from PSC change count included in the sleep response message (SLP-RSP) which is previously transmitted. The base station which has received the sleep report message transmits the sleep response message (MOB_SLP-RSP) to redefine PSC IDs included in the sleep report message.

TABLE 12

| Syntax | Size | Notes |
|---|---|---|
| MOB_SLP_REP_Message_Format( ) { | | |
| Management Message Type = xx | 8 bits | |
| Number of Classes | 8 bits | The number of PSCs ID which requires redefinition |
| For(i=0; i< Number_of_Classes; i++) { | — | |
| Power_Saving_Class_ID | 6 bits | PSC ID to be redefined |
| Reserved | 2 bits | |
| } | — | |
| CMAC Tuple | | |
| } | | |

Table 13 illustrates an example of a sleep count request message (MOB_SLP-CREQ) suggested in the embodiment of the present invention. The sleep count request message indicates that the base station requests the mobile station of the PSC change count during the listening interval corresponding to the first listening window with respect to the power saving class to identify redefinition of the power saving class after requesting redefinition of the activated power saving class.

TABLE 13

| Syntax | Size | Notes |
|---|---|---|
| MOB_SLP-CREQ_Message_Format( ) { | | |
| Management Message Type = xx | 8 bits | |
| Number of Classes | 8 bits | The number of activated PSCs which the base station has requested redefinition and activation. |
| For (i=0; i< Number_of_Classes; i++) { | — | |
| Power_Saving_Class_ID | 6 bits | ID of activated PSCs which the base station has requested redefinition and activation. |
| Reserved | 2 bits | |
| } | — | |
| CMAC Tuple | | |
| } | | |

Table 14 illustrates an example of a sleep count response message (MOB_SLP-CRSP) which is transmitted to from the mobile station to the base station in response to the sleep count request message (MOB_SLP-CREQ) when the mobile station receives the sleep count request message (MOB_SLP-CRE Q) from the base station. The sleep count response message (MOB_SLP-CRSP) includes power saving change count information designated in the sleep count request message.

TABLE 14

| Syntax | Size | Notes |
|---|---|---|
| MOB_SLP-CRSP_Message_Format( ) { | | |
| Management Message Type = xx | 8 bits | |
| Number of Classes | 8 bits | The number of activated PSCs which the base station has requested redefinition and activation. |
| For (i=0; i< Number_of_Classes; i++) { | | |
| Power_Saving_Class_ID | 6 bits | ID of activated PSCs which the base station has requested redefinition and activation. |
| Reserved | 2 bits | |
| PSC Change Count | 8 bits | PSC Change Count of PSC ID |
| } | — | |
| CMAC Tuple | | |
| } | | |

Figure 14:
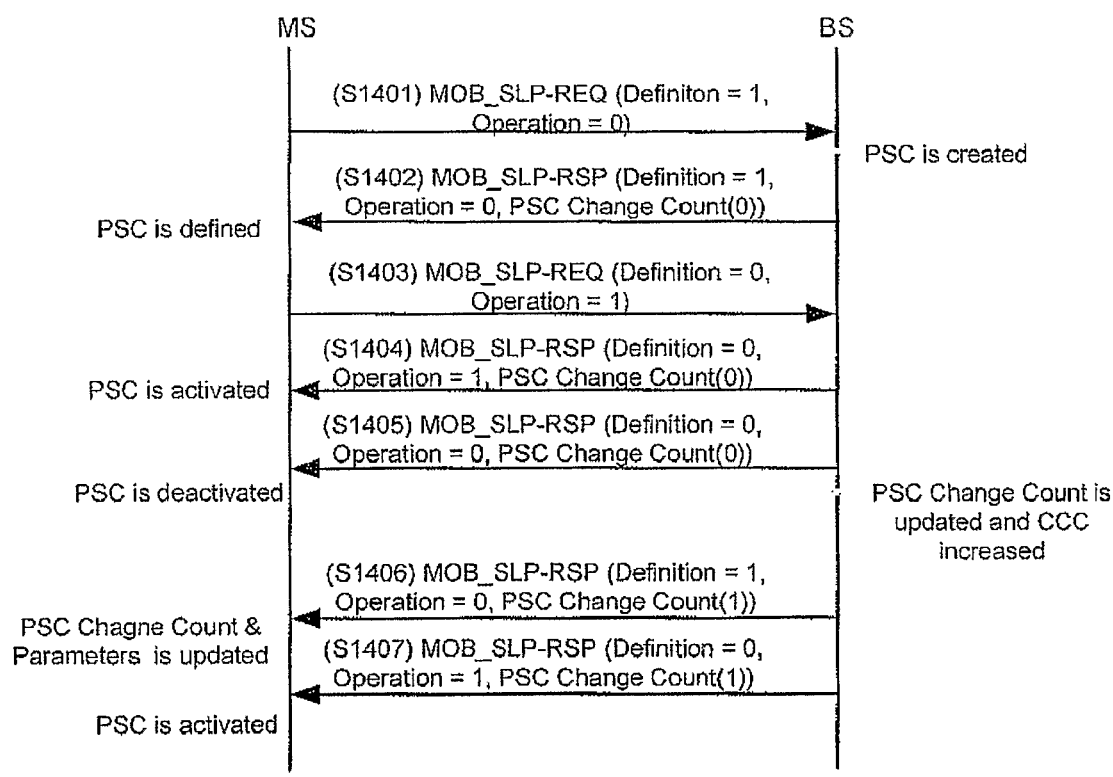

FIG. 14 illustrates the embodiment suggested in the present invention, i.e., the operation of the base station and the mobile station when the mobile station has successfully received the sleep response message for redefinition, wherein the sleep response message includes PSC change count.

(S1401) The mobile station can request definition of the parameter of the power saving class by transmitting the sleep request message to the base station. The base station which has received the sleep request message generates a new power saving class.

(S1402) The base station approves parameter definition of the power saving class by transmitting the sleep response message to the mobile station.

(S1403) The mobile station can request activation of the power saving class by transmitting the sleep request message, of which operation field value is set to 1, to the base station.

(S1404) The base station approves activation request of the power saving class by transmitting the sleep response message to the mobile station.

(S1405) If the power saving class of the mobile station needs to be deactivated on the ground that downlink traffic occurs in the mobile station, the base station commands the mobile station to perform deactivation of the power saving class through the sleep response message or the control message of the downlink sleep control subheader. The mobile station which has received the sleep response message deactivates the power saving class and is operated in a general mode.

(S1406) When the parameter of the power saving class has been changed, the base station increases the PSC change count by 1. The base station transmits the sleep response message to the mobile station in order to redefine the changed parameters of the power saving class, wherein the sleep response message has a definition field value set to 1 and includes the changed PSC change count and the parameter of the power saving class. The mobile station which has received the sleep response message updates the parameters of the power saving class and the PSC change count values to values included in the sleep response message.

(S1407) If the base station needs to activate the power saving class, the base station transmits the sleep response message to the mobile station to command activation of the power saving class. The mobile station which has received the sleep response message compares its PSC change count with the PSC change count included in the sleep response message. If the PSC change count stored in the mobile station is equal to the PSC change count included in the sleep response message, the mobile station activates the power saving class.

Figure 15:
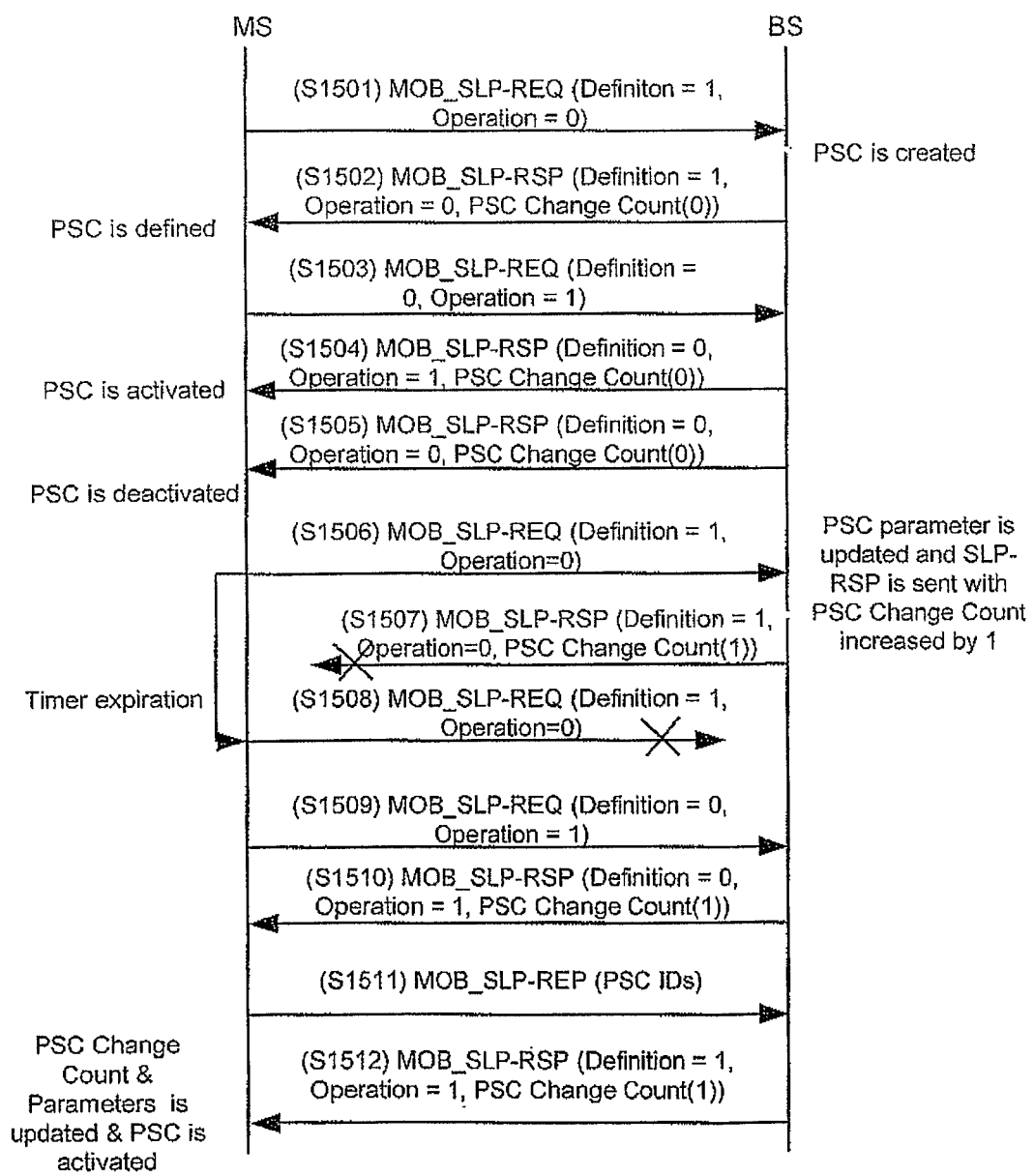

FIG. 15 illustrates the embodiment suggested in the present invention, i.e., the operation between the base station and the mobile station when the sleep control message is lost after the mobile station transmits the sleep request message to the base station so as to request redefinition in a state that the power saving class is deactivated.

(S1501) The mobile station can request definition of the parameter of the power saving class by transmitting the sleep request message to the base station. The base station which has received the sleep request message generates a new power saving class.

(S1502) The base station approves parameter definition of the power saving class by transmitting the sleep response message to the mobile station.

(S1503) The mobile station can request activation of the power saving class by transmitting the sleep request message, of which operation field value is set to 1, to the base station.

(S1504) The base station approves activation request of the power saving class by transmitting the sleep response message to the mobile station.

(S1505) If the power saving class of the mobile station needs to be deactivated on the ground that downlink traffic occurs in the mobile station, the base station commands the mobile station to perform deactivation of the power saving class through the sleep response message or the control message of the downlink sleep control subheader. The mobile station which has received the sleep response message deactivates the power saving class and is operated in a general mode.

(S1506) When redefinition of the parameter of the power saving class is needed due to its change, the mobile station transmits the sleep request message (MOB_SLP-REQ) to the base station. The base station which has received the sleep request message increases the PSC change count by 1 after updating the parameters of the power saving class.

(S1507) The base station transmits the sleep response message after including the changed PSC change count in the sleep response message. At this time, the sleep response message may be lost.

(S1508) If a timer of the sleep request message ends, the mobile station may retransmit the message. At this time, the message may be lost. The number of retransmission attempt count times can exceed a maximum value. If the mobile station has not received a response message to sleep request, the mobile station will maintain previous values of the power saving class parameters.

(S1509) The mobile station transmits the sleep request message to activate the power saving class.

(S1510) The base station receives the sleep request message and transmits a sleep response message to the base station in response to the sleep request message, wherein the sleep response message includes the PSC change count.

(S1511) When the mobile station which has received the sleep response message determines that its PSC change count value (0) is different from the PSC change count value (1) included in the sleep response message, the mobile station forwards the sleep report message (MOB_SLP-REP) to the base station.

(S1512) For redefinition and activation of the power saving class based on the power saving class IDs included in the sleep report message, the base station which has received the sleep report message transmits the sleep response message (MOB_SLP-RSP) to the mobile station. The mobile station which has received the sleep response message updates the changed parameters of the power saving class and the PSC change count values, and activates the power saving classes.

Figure 16:
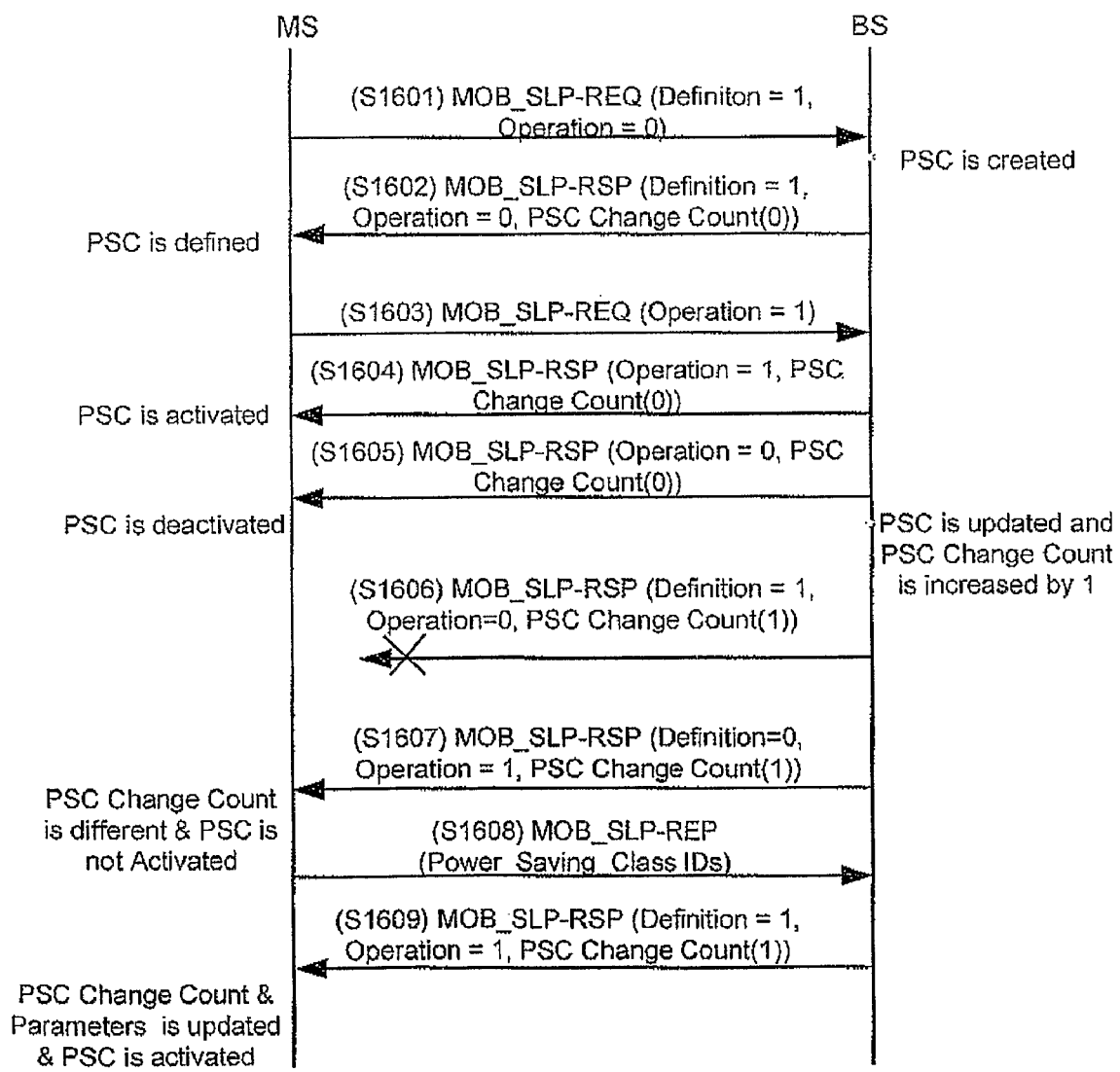

FIG. 16 illustrates the embodiment suggested in the present invention, i.e., the operation of the mobile station when the mobile station has not received the sleep response message for redefinition, wherein the sleep response message includes the PSC change count.

(S1601) The mobile station can request definition of the parameter of the power saving class by transmitting the sleep request message to the base station. The base station which has received the sleep request message generates a new power saving class.

(S1602) The base station approves parameter definition of the power saving class by transmitting the sleep response message to the mobile station.

(S1603) The mobile station can request activation of the power saving class by transmitting the sleep request message, of which operation field value is set to 1, to the base station.

(S1604) The base station approves activation request of the power saving class by transmitting the sleep response message to the mobile station.

(S1605) If the power saving class of the mobile station needs to be deactivated on the ground that downlink traffic occurs in the mobile station, the base station commands the mobile station to perform deactivation of the power saving class through the sleep response message or the control message of the downlink sleep control subheader. The mobile station which has received the sleep response message deactivates the power saving class and is operated in a general mode.

(S1606) When the parameter of the power saving class has been changed, the base station increases the PSC change count by 1. The base station transmits the sleep response message to the mobile station in order to redefine the changed parameters of the power saving class, wherein the sleep response message has a definition field value set to 1 and includes the changed PSC change count and the parameter of the power saving class. However, if the sleep response message is lost, the mobile station fails to update the changed parameters of the power saving class and the PSC change count values.

(S1607) The base station can activate the power saving class by transmitting the sleep response message. If it is identified that the PSC change count value of the mobile station is different from the PSC change count value included in the sleep response message, the mobile station which has received the sleep response message determines that the power saving class parameter has been changed but the changed power saving class parameter has not been applied to the mobile station, and does not activate the power saving class.

(S1608) The mobile station transmits the sleep report message (MOB_SLP-REP) to the base station to obtain a right power saving class parameter.

(S1609) For redefinition and activation of the power saving class based on the power saving class IDs included in the sleep report message, the base station which has received the sleep report message transmits the sleep response message (MOB_SLP-RSP) to the mobile station. The mobile station which has received the sleep response message updates the changed parameters of the power saving class and the PSC change count values, and activates the power saving classes.

Figure 17:
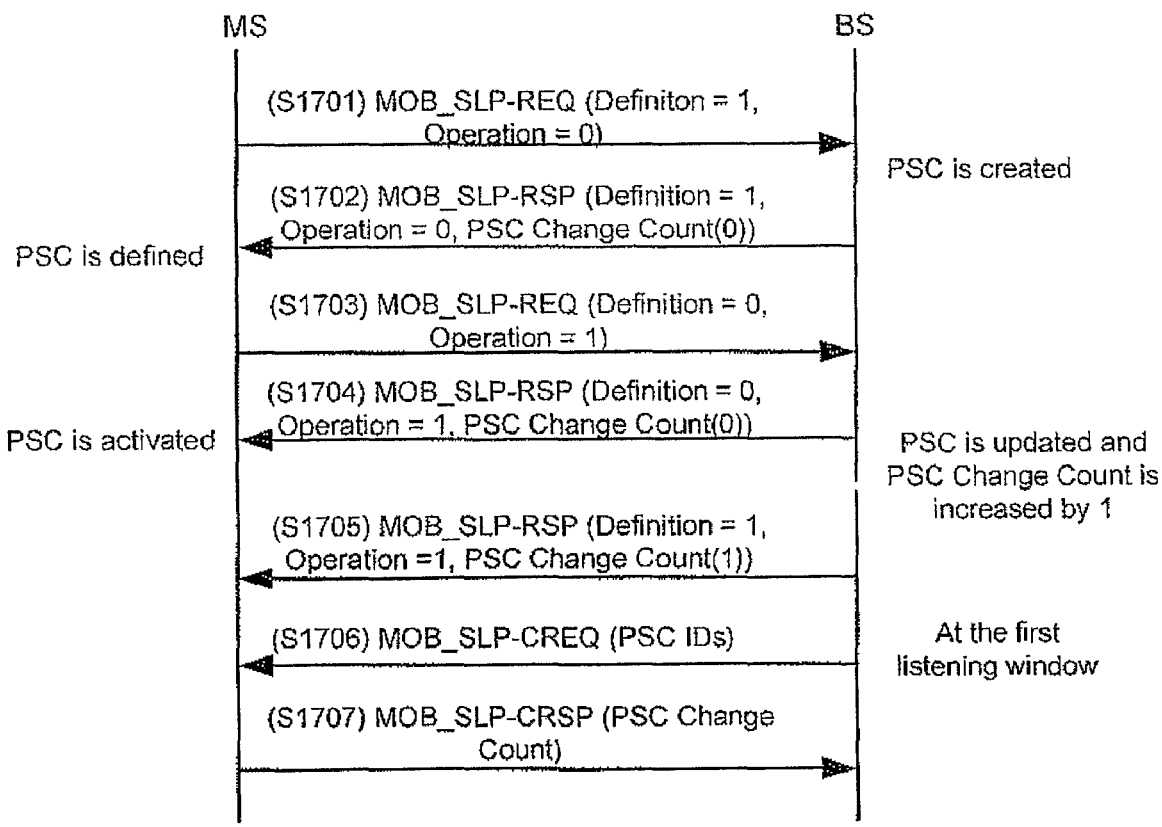

FIG. 17 illustrates the embodiment suggested in the present invention, i.e., the operation between the base station and the mobile station when the base station transmits the sleep response message (MOB_SLP-RSP) for redefinition and activation of the PSC in a state that the PSC is activated.

(S1701) The mobile station can request definition of the parameter of the power saving class by transmitting the sleep request message to the base station. The base station which has received the sleep request message generates a new power saving class.

(S1702) The base station approves parameter definition of the power saving class by transmitting the sleep response message to the mobile station.

(S1703) The mobile station can request activation of the power saving class by transmitting the sleep request message, of which operation field value is set to 1, to the base station.

(S1704) The base station approves activation request of the power saving class by transmitting the sleep response message to the mobile station.

(S1705) When the parameter of the power saving class has been changed, the base station increases the PSC change count by 1. The base station transmits the sleep response message to the mobile station in order to redefine the changed parameters of the power saving class, wherein the sleep response message has a definition field value set to 1 and includes the changed PSC change count and the parameters of the power saving class. At this time, the base station sets the operation field value to 1, so as to directly activate the power saving class. The mobile station which has received the sleep response message from the base station updates the PSC change count and parameters related to the power saving class, and maintains the power saving class by using a new parameter.

(S1706) If the base station transmits the sleep response message to the mobile station to perform redefinition and activation of the power saving class in a state that the power saving class is activated, the base station transmits the sleep count request message to the mobile station during the listening interval corresponding to the first listening window of the power saving class, wherein the sleep count request message includes ID related to the power saving class change count.

(S1707) The mobile station which has received the sleep count request message transmits the sleep count response message to the base station in response to the sleep count request message, wherein the sleep count response message includes the power saving class change count. After it is identified that the PSC change count value of the base station is different from the PSC change count value included in the sleep count response message, the base station maintains the current parameter value and the activation state.

Figure 18:
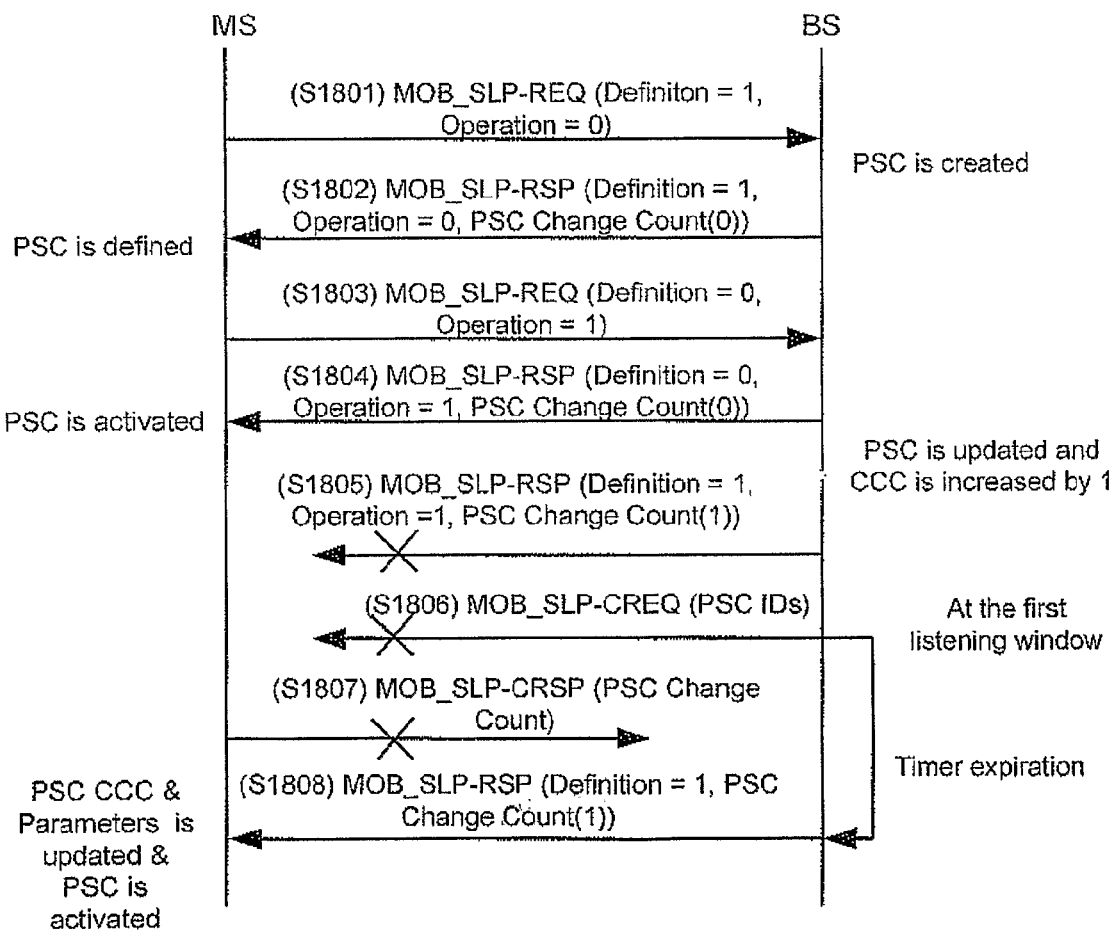

Next, FIG. 18 illustrates the embodiment suggested in the present invention, i.e., the operation between the base station and the mobile station when the base station transmits the sleep response message (MOB_SLP-RSP) for redefinition and activation of the PSC in a state that the PSC is activated.

(S1801) The mobile station can request definition of the parameter of the power saving class by transmitting the sleep request message to the base station. The base station which has received the sleep request message generates a new power saving class.

(S1802) The base station approves parameter definition of the power saving class by transmitting the sleep response message to the mobile station.

(S1803) The mobile station can request activation of the power saving class by transmitting the sleep request message, of which operation field value is set to 1, to the base station.

(S1804) The base station approves activation request of the power saving class by transmitting the sleep response message to the mobile station.

(S1805) When the parameter of the power saving class has been changed, the base station increases the PSC change count by 1. The base station transmits the sleep response message to the mobile station in order to redefine the changed parameters of the power saving class, wherein the sleep response message has a definition field value set to 1 and includes the changed PSC change count and the parameters of the power saving class. At this time, the base station sets the operation field value to 1, so as to directly activate the power saving class. However, if the sleep response message is lost, the mobile station fails to update the changed parameters of the power saving class and the PSC change count values.

(S1806) If the base station transmits the sleep response message to the mobile station to perform redefinition and activation of the power saving class in a state that the power saving class is activated, the base station transmits the sleep count request message (MOB_SLP-CREQ) to the mobile station during the listening interval corresponding to the first listening window of the power saving class, wherein the sleep count request message includes ID related to the power saving class change count.

(S1807) The mobile station which has not received the sleep count request message cannot transmit the sleep count response message to the base station.

(S1808) The base station which has not received the sleep count response message until a designated timer ends transmits the sleep response message (MOB_SLP-RSP) to the mobile station to perform redefinition, wherein the sleep response message includes a definition field value set to 1 and an operation field value set to 1. The mobile station which has received the sleep response message updates the changed parameters of the power saving class and the PSC change count values, and activates the power saving classes.

Figure 19:
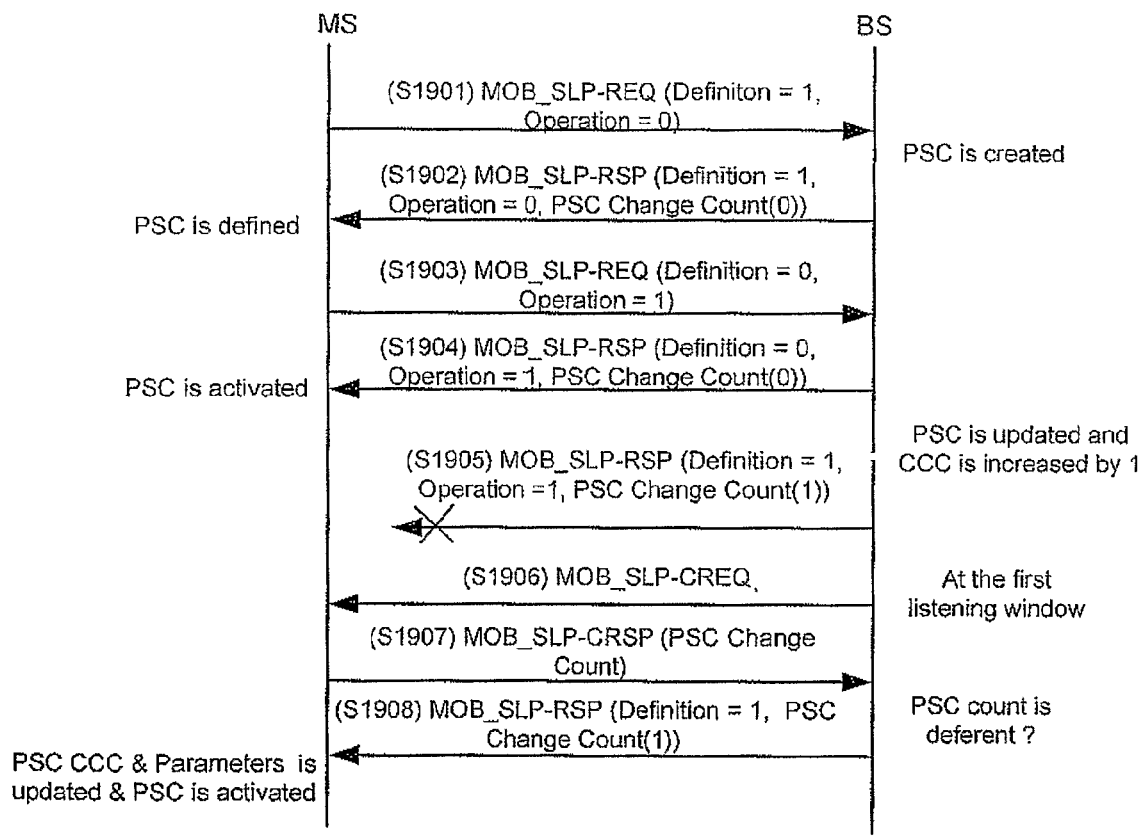

Next, FIG. 19 illustrates the embodiment suggested in the present invention, i.e., the operation between the base station and the mobile station to maintain synchronization when the base station transmits the sleep response message (MOB_SLP-RSP) for redefinition and activation of the PSC in a state that the PSC is activated.

(S1901) The mobile station can request definition of the parameter of the power saving class by transmitting the sleep request message to the base station. The base station which has received the sleep request message generates a new power saving class.

(S1902) The base station approves parameter definition of the power saving class by transmitting the sleep response message to the mobile station.

(S1903) The mobile station can request activation of the power saving class by transmitting the sleep request message, of which operation field value is set to 1, to the base station.

(S1904) The base station approves activation request of the power saving class by transmitting the sleep response message to the mobile station.

(S1905) When the parameter of the power saving class has been changed, the base station increases the PSC change count by 1. The base station transmits the sleep response message to the mobile station in order to redefine the changed parameters of the power saving class, wherein the sleep response message has a definition field value set to 1 and includes the changed PSC change count and the parameters of the power saving class. At this time, the base station sets the operation field value to 1, so as to directly activate the power saving class. However, if the sleep response message is lost, the mobile station fails to update the changed parameters of the power saving class and the PSC change count values.

(S1906) If the base station transmits the sleep response message to the mobile station to perform redefinition and activation of the power saving class in a state that the power saving class is activated, the base station transmits the sleep count request message (MOB_SLP-CREQ) to the mobile station during the listening interval corresponding to the first listening window of the power saving class, wherein the sleep count request message includes ID related to the power saving class change count.

(S1907) The mobile station which has received the sleep count request message transmits the sleep count response message to the base station in response to the sleep count request message, wherein the sleep count response message includes the power saving class change count.

(S1908) The base station which has received the sleep count response message compares the power saving class change count value included in the sleep count response message with its value stored therein. As a result, if the power saving class change count value included in the sleep count response message is different from the value stored in the base station, the base station transmits the sleep response message (MOB_SLP-RSP) to the mobile station to perform redefinition, wherein the sleep response message includes a definition field value set to 1 and an operation field value set to 1. The mobile station which has received the sleep response message updates the changed parameters of the power saving class and the PSC change count values, and activates the power saving classes.

Hereinafter, another methods for preventing inconsistency of the parameters of the power saving class have been suggested, wherein the inconsistency is caused by loss of the sleep control message between the mobile station and the base station.

After the mobile station transmits the sleep request message to the base station to perform redefinition and reactivation of the power saving class, when the mobile station has not received the sleep response message to the sleep request message until the retransmission count is exhausted, the mobile station deactivates the current PSC without the previous PSC.

The mobile station can retransmit the sleep message after a certain time period when every sleep message transmission has been failed.

When every sleep message transmission has been failed, the mobile station can allow the base station to receive a downlink message well by forwarding downlink channel information to the base station through CQICH or transmitting MAC management message (MOB_SLP-ERROR) to the base station, wherein the MAC management message includes MCS level information (desired DIUC information and the number of repetition times).

Figure 20:
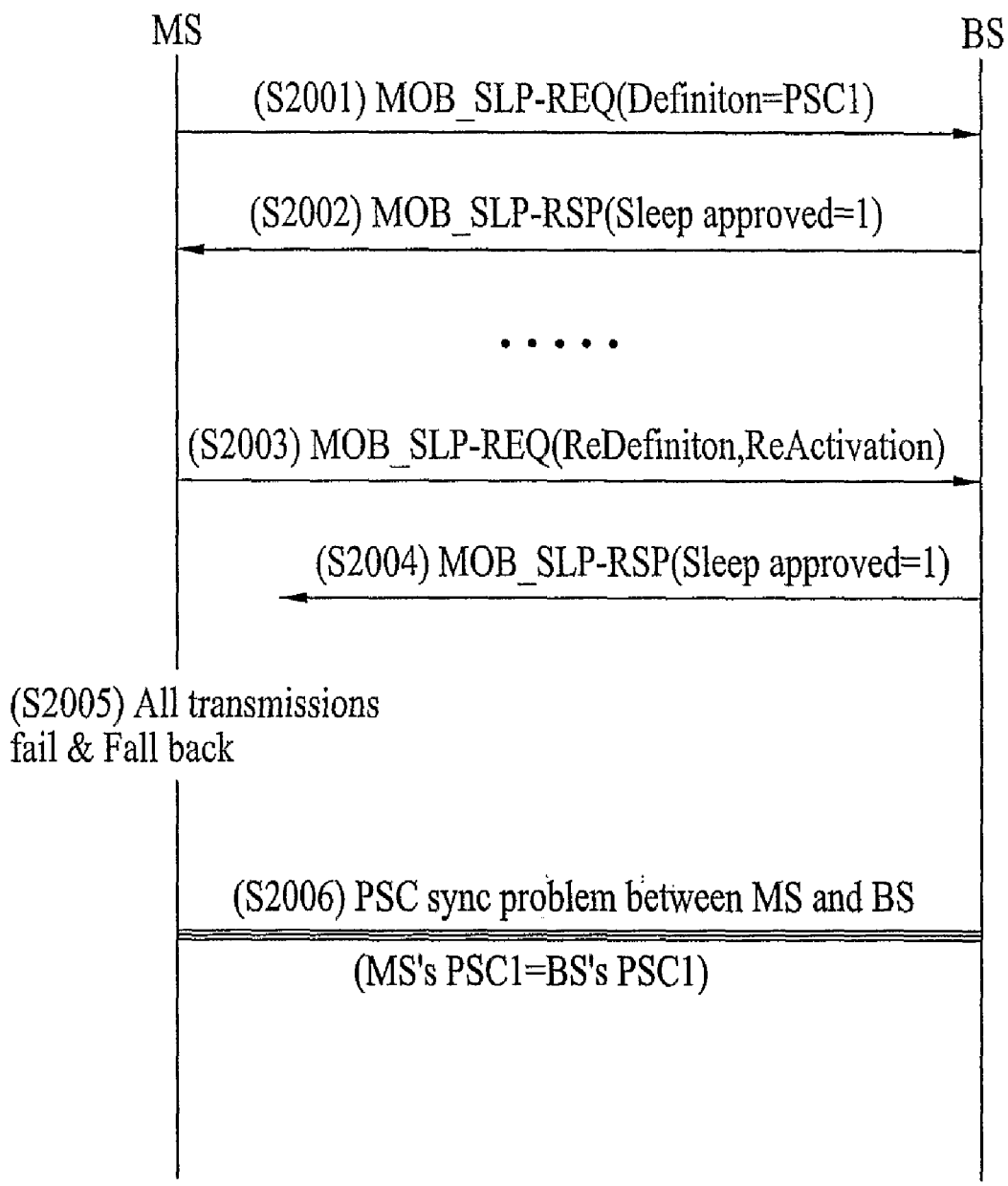

FIG. 20 illustrates an example of a problem occurring when the control message for redefinition and reactivation of the PSC which is currently activated is lost.

The mobile station transmits the sleep request message to the base station to define the PSC (S2001). The base station which has received the sleep request message transmits the sleep response message to the mobile station (S2002), and the mobile station is operated in a sleep mode by using the defined PSC. The mobile station transmits the sleep request message to the base station to redefine and reactivate the PSC (S2003). The base station which has received the sleep request message updates related parameters and then operates the sleep mode by using the updated PSC. Afterwards, the base station transmits the sleep response message to the mobile station but the mobile station does not receive the message due to channel deterioration (S2004). The mobile station which has not received the sleep response message retransmits the sleep request message to the base station. If the mobile station does not receive the sleep response message to the sleep request message before the retransmission count is exhausted, i.e., if every retransmission of the sleep request message is failed, the mobile station operates the sleep mode by using the previous power saving class (PSC) (S2005). In this case, inconsistency between the parameter of the PSC of the mobile station and the parameter of the PSC of the base station occurs, whereby message loss between the mobile station and the base station may occur (S2006).

Figure 21:
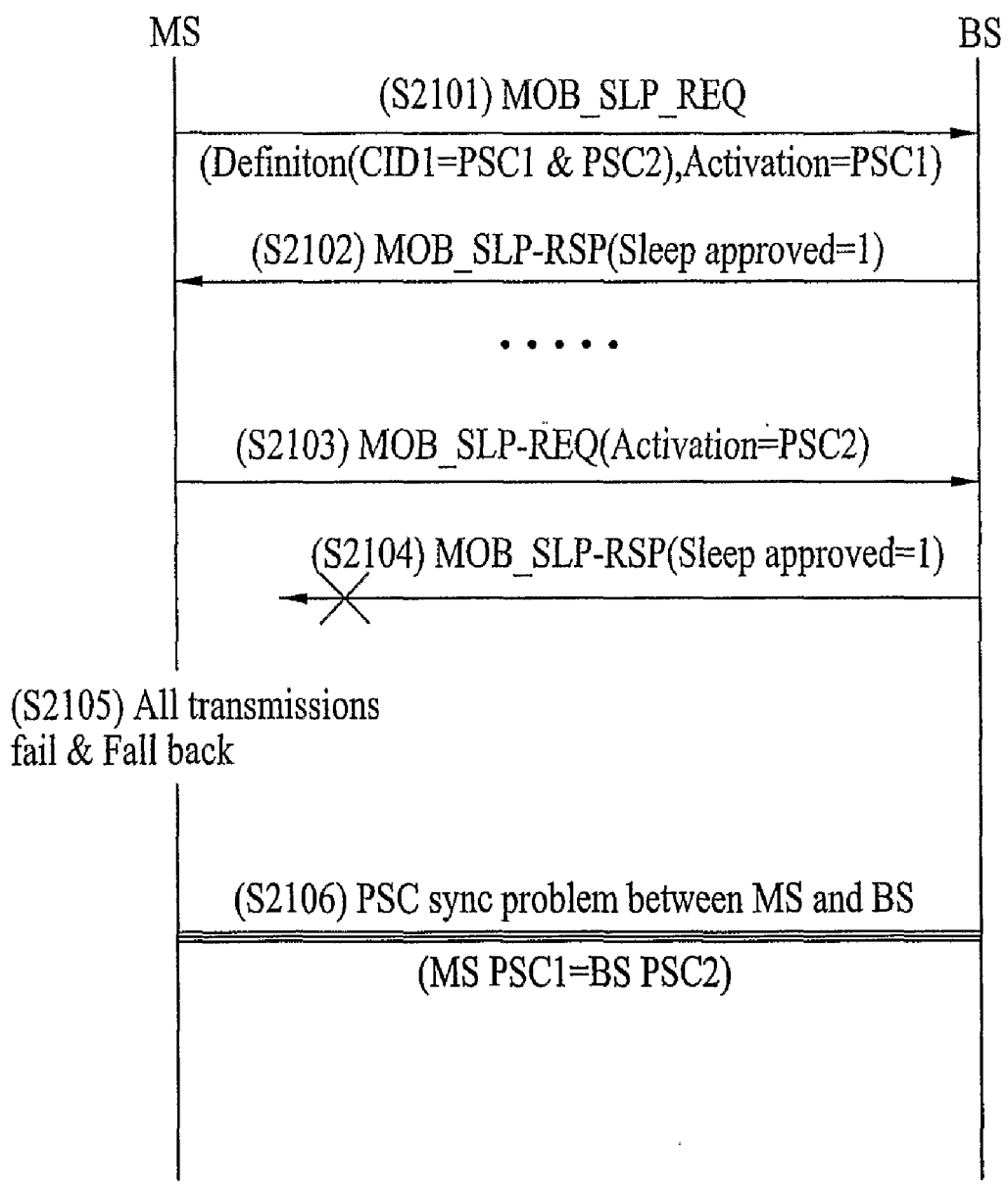

FIG. 21 illustrates an embodiment of a synchronization problem between the mobile station and the base station when the sleep control message is lost during PSC conversion in a scenario which operates the sleep mode by activating one PSC only depending on circumstances after one CID is defined by one or more PSCs.

The mobile station transmits the sleep request message to the base station to activate PSC1 only after defining PSC1 and PSC2 with respect to one CID1 (S2101). The base station which has received the sleep request message transmits the sleep response message to the mobile station, and the mobile station is operated in the sleep mode by using the defined and activated PSC (S2102). The mobile station transmits the sleep request message to the base station to activate the other PSC2 (S2103). The base station which has received the sleep request message operates the sleep mode by using PSC2. Afterwards, the base station transmits the sleep response message to the mobile station but the mobile station does not receive the message due to channel deterioration (S2104). The mobile station which has not received the sleep response message retransmits the sleep request message to the base station. If the mobile station does not receive the sleep response message to the sleep request message before the retransmission count is exhausted, i.e., if every retransmission of the sleep request message is failed, the mobile station operates the sleep mode by using the previous power saving class (PSC1) (S2105). In this case, the synchronization problem of the sleep mode between the mobile station and the base station occurs, whereby message loss may occur (S2106).

Figure 22:
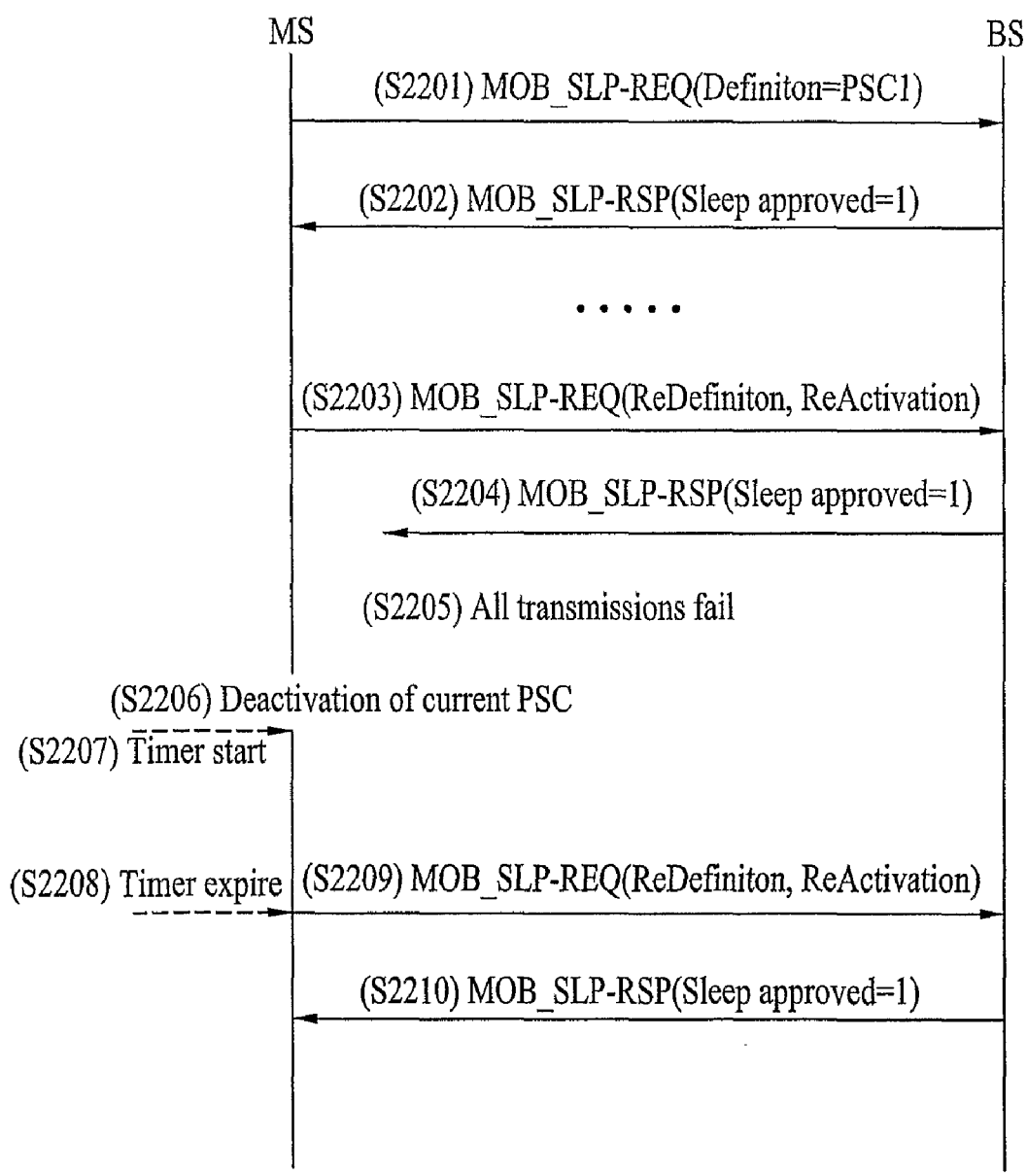

FIG. 22 illustrates an embodiment suggested in the present invention to solve the synchronization problem of the sleep mode between the mobile station and the base station.

The mobile station transmits the sleep request message to the base station to define the PSC (S2201). The base station which has received the sleep request message transmits the sleep response message to the mobile station (S2202), and the mobile station is operated in the sleep mode by using the defined PSC. The mobile station transmits the sleep request message to the base station to redefine and reactivate the PSC (S2203). The base station which has received the sleep request message updates related parameters and then operates the sleep mode by using the updated PSC. Afterwards, the base station transmits the sleep response message to the mobile station but the mobile station does not receive the message due to channel deterioration (S2204). The mobile station which has not received the sleep response message retransmits the sleep request message to the base station. If the mobile station does not receive the sleep response message to the sleep request message before the retransmission count is exhausted, i.e., if every retransmission of the sleep request message is failed (S2205), the mobile station deactivates the currently activated power saving class (S2206), and transmits the sleep request message after a certain time period (n frame or if a designated timer ends), so as to request redefinition and reactivation of the PSC (S2207) to (S2209). The base station transmits the sleep response message to the mobile station in response to the sleep request message (S2210).

Figure 23:
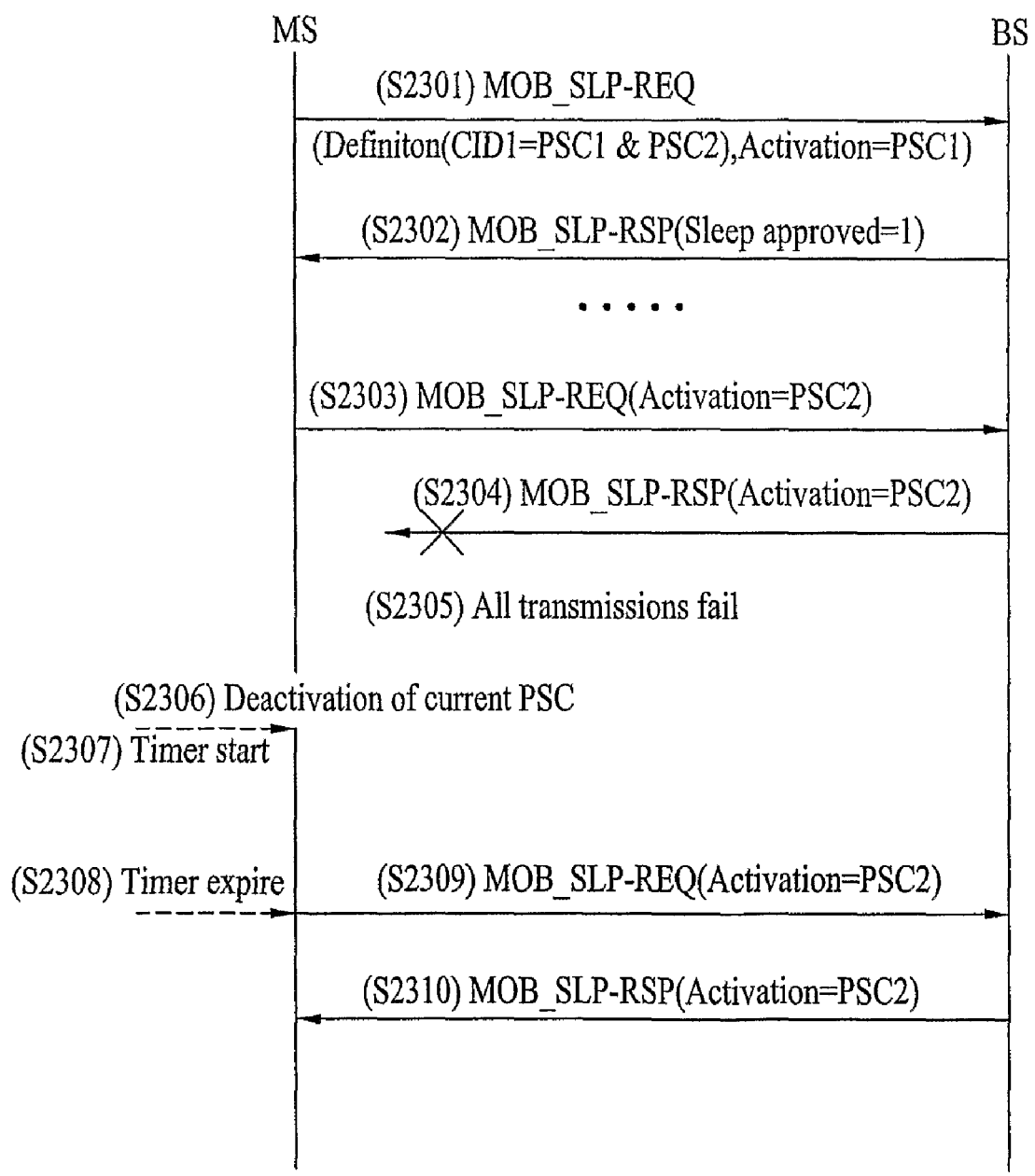

FIG. 23 illustrates another embodiment suggested in the present invention to solve the synchronization problem of the sleep mode between the mobile station and the base station.

The mobile station transmits the sleep request message to the base station to activate PSC1 only after defining PSC1 and PSC2 with respect to one CID1 (S2301). The base station which has received the sleep request message transmits the sleep response message to the mobile station, and the mobile station is operated in the sleep mode by using the defined and activated PSC (S2302). The mobile station transmits the sleep request message to the base station to activate the other PSC2 (S2303). The base station which has received the sleep request message operates the sleep mode by using PSC2. Afterwards, the base station transmits the sleep response message to the mobile station but the mobile station does not receive the message due to channel deterioration (S2304). The mobile station which has not received the sleep response message retransmits the sleep request message to the base station. If the mobile station does not receive the sleep response message to the sleep request message before the retransmission count is exhausted, i.e., if every retransmission of the sleep request message is failed (S2305), the mobile station deactivates the currently activated power saving class (S2306), and transmits the sleep request message after a certain time period (n frame or if a designated timer ends), so as to request PSC conversion (S2307) to (S2309). The base station transmits the sleep response message to the mobile station in response to the sleep request message (S2310).

Figure 24:
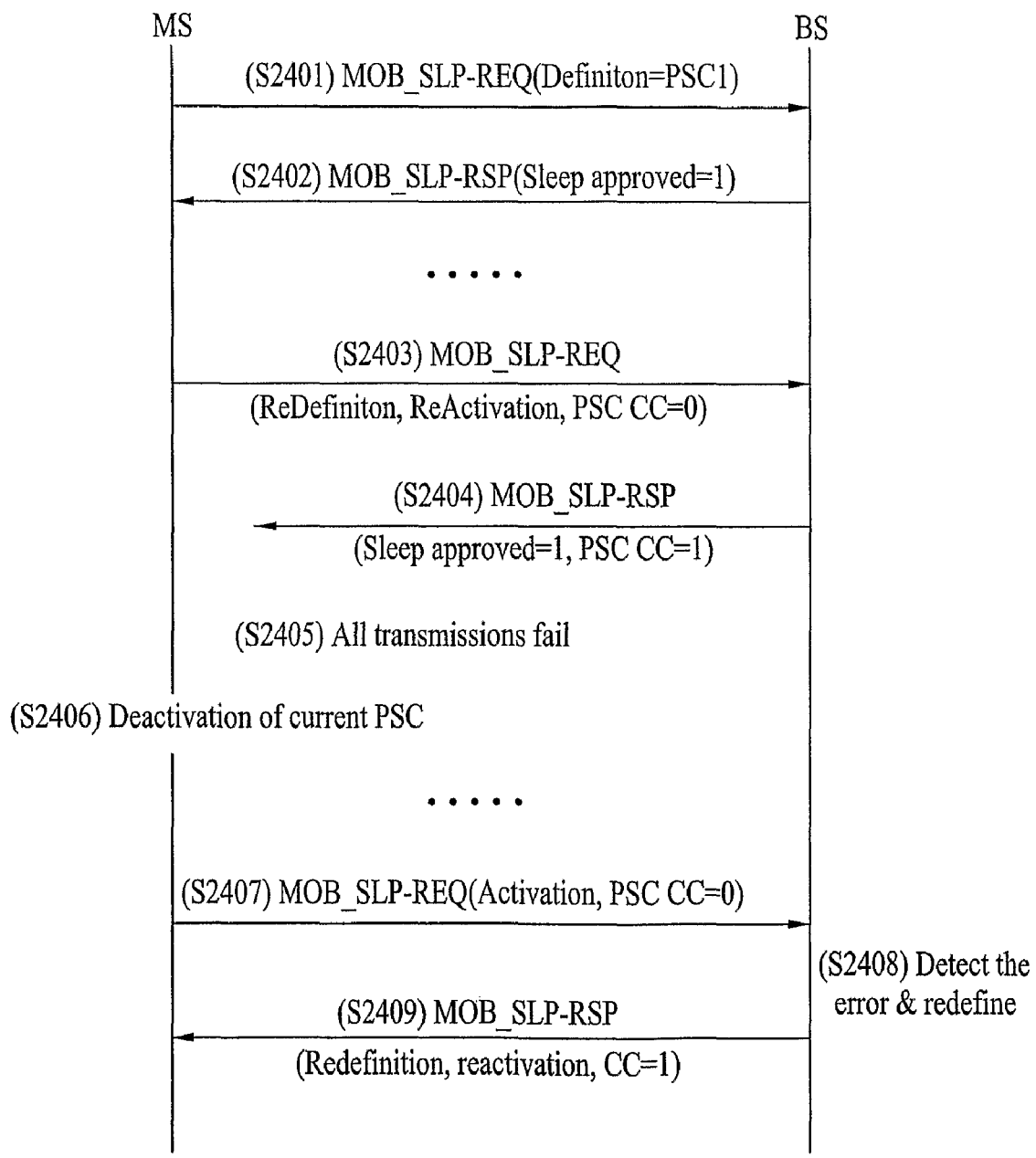

FIG. 24 illustrates another embodiment suggested in the present invention to solve the synchronization problem of the sleep mode between the mobile station and the base station.

The mobile station transmits the sleep request message to the base station to define the PSC (S2401). The base station which has received the sleep request message transmits the sleep response message to the mobile station (S2402), and the mobile station is operated in the sleep mode by using the defined PSC. The mobile station transmits the sleep request message to the base station to redefine and reactivate the PSC (S2403). The base station which has received the sleep request message updates related parameters and then operates the sleep mode by using the updated PSC. Afterwards, the base station transmits the sleep response message to the mobile station but the mobile station does not receive the message due to channel deterioration (S2404). The mobile station which has not received the sleep response message retransmits the sleep request message to the base station. If the mobile station does not receive the sleep response message to the sleep request message before the retransmission count is exhausted, i.e., if every retransmission of the sleep request message is failed (S2405), the mobile station deactivates the currently activated power saving class (S2406). The mobile station requests the base station of activation of the sleep mode by using the currently defined PSC (S2407). At this time, the mobile station includes PSC change count set to 0 in the sleep request message (S2407). The base station which has received the sleep request message compares the PSC change count (0) included in the message with its PSC change count (1), and identifies that the PSC change count (0) included in the message is different from its PSC change count (1). The base station does not activate the PSC (S2408), and transmits the sleep response message to the mobile station, wherein the sleep response message includes an indicator rejecting activation (Sleep approved=0). At this time, the base station includes PSC parameters suitable for the current PSC in the sleep response message (S2409).

Figure 25:
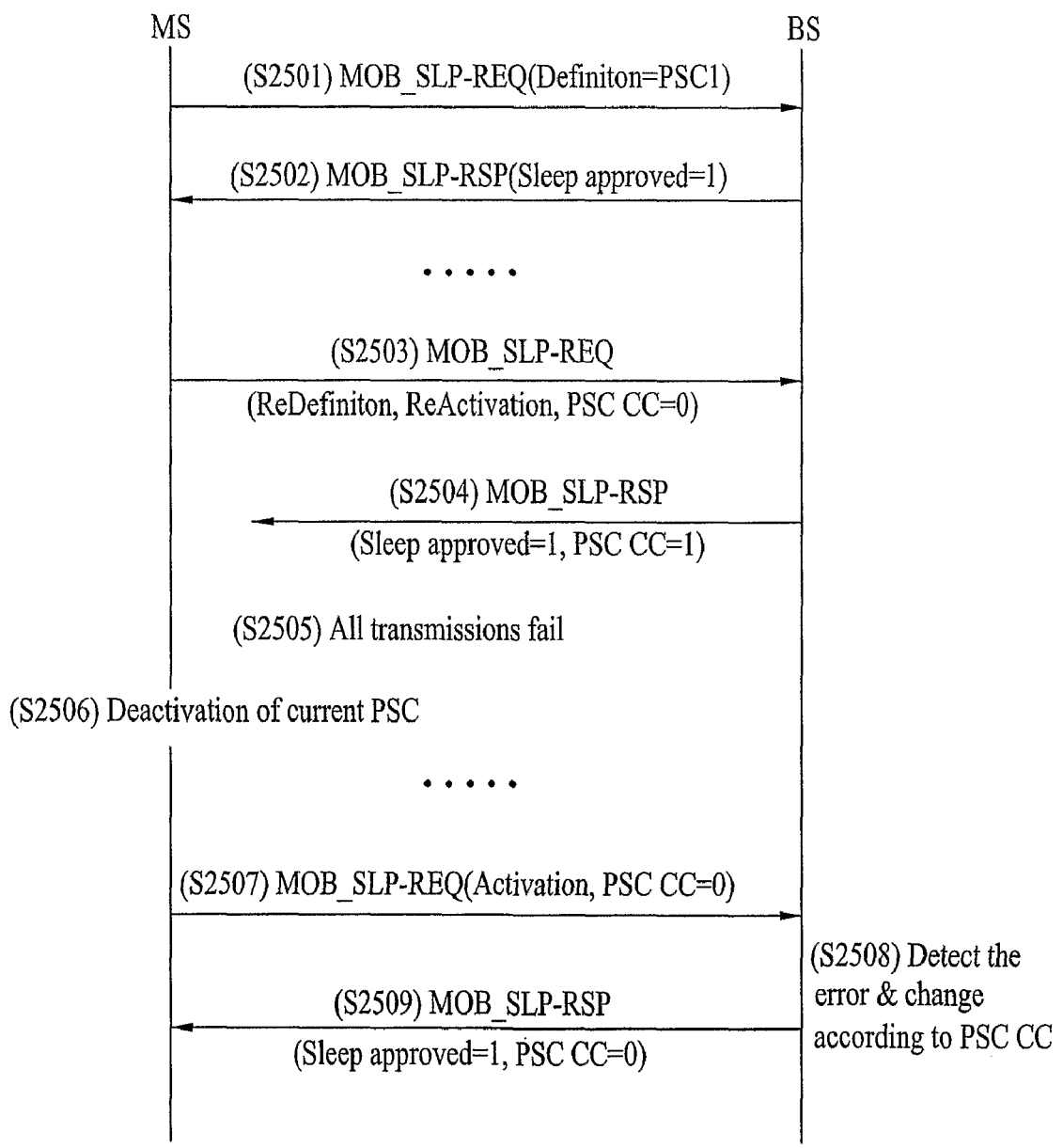

FIG. 25 illustrates another embodiment suggested in the present invention to solve the synchronization problem of the sleep mode between the mobile station and the base station.

FIG. 25 illustrates the embodiment in case that the base station maintains previous information of PSC when performing redefinition of the PSC.

The mobile station transmits the sleep request message to the base station to define the PSC (S2501). The base station which has received the sleep request message transmits the sleep response message to the mobile station (S2502), and the mobile station is operated in the sleep mode by using the defined PSC. The mobile station transmits the sleep request message to the base station to redefine and reactivate the PSC (S2503). The base station which has received the sleep request message updates related parameters and then operates the sleep mode by using the updated PSC. Afterwards, the base station transmits the sleep response message to the mobile station but the mobile station does not receive the message due to channel deterioration (S2504). The mobile station which has not received the sleep response message retransmits the sleep request message to the base station. If the mobile station does not receive the sleep response message to the sleep request message before the retransmission count is exhausted, i.e., if every retransmission of the sleep request message is failed (S2505), the mobile station deactivates the currently activated power saving class (S2506). The mobile station requests the base station of activation of the sleep mode by using the currently defined PSC (S2507). At this time, the mobile station includes PSC change count set to 0 in the sleep request message (S2507). The base station which has received the sleep request message compares the PSC change count (0) included in the message with its PSC change count (1), and identifies that the PSC change count (0) included in the message is different from its PSC change count (1). The base station does not activate the PSC (S2508). The base station updates its PSC with parameters corresponding to the PSC change count of the sleep request message, and activates the PSC with the updated parameters (S2508). The base station transmits the sleep response message to the mobile station, wherein the sleep response message includes an indicator accepting activation (Sleep approved=1) (S2509). The mobile station which has received the sleep response message activates the PSC.

Figure 26:
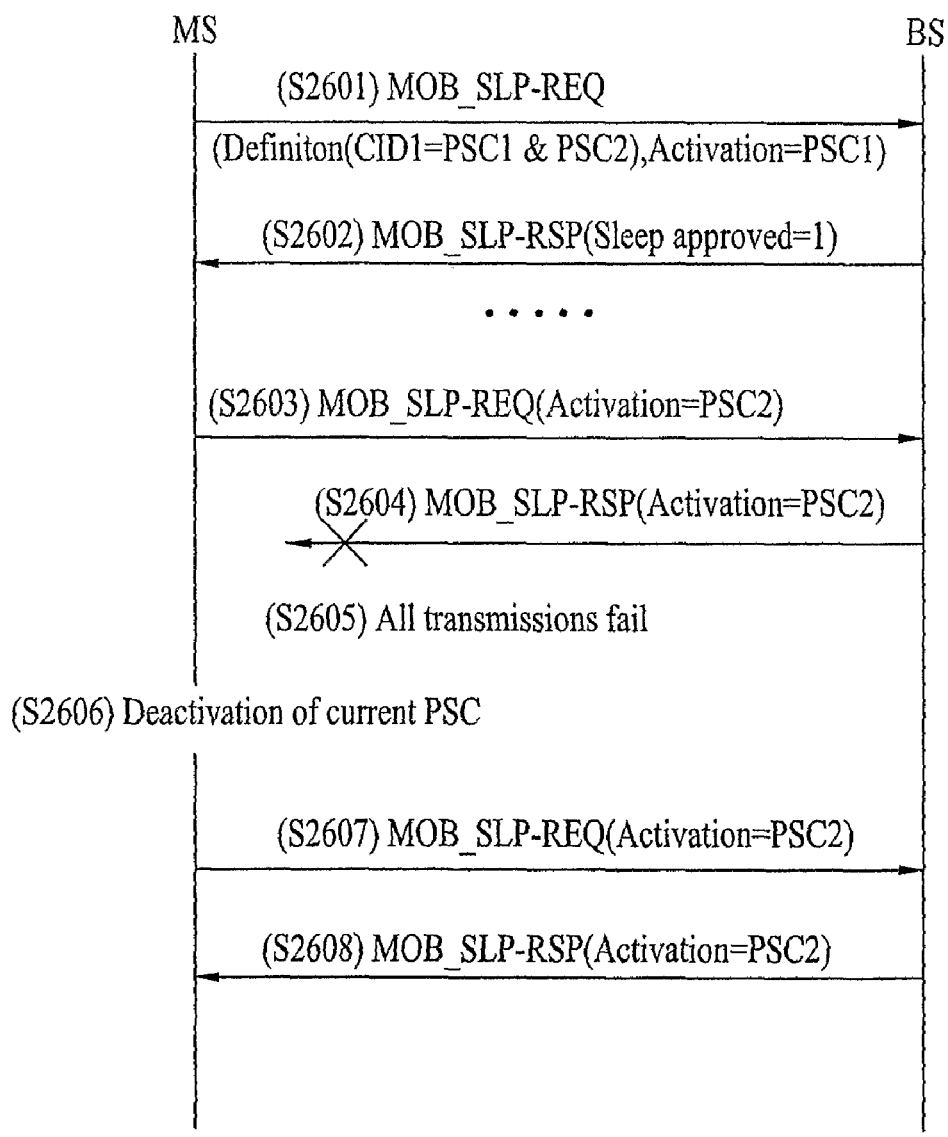

FIG. 26 illustrates another embodiment suggested in the present invention to solve the synchronization problem of the sleep mode between the mobile station and the base station.

The mobile station transmits the sleep request message to the base station to activate PSC1 only after defining PSC1 and PSC2 with respect to one CID1 (S2601). The base station which has received the sleep request message transmits the sleep response message to the mobile station, and the mobile station is operated in the sleep mode by using the defined and activated PSC (S2602). The mobile station transmits the sleep request message to the base station to activate the other PSC2 (S2603). The base station which has received the sleep request message operates the sleep mode by using PSC2. Afterwards, the base station transmits the sleep response message to the mobile station but the mobile station does not receive the message due to channel deterioration (S2604). The mobile station which has not received the sleep response message retransmits the sleep request message to the base station. If the mobile station does not receive the sleep response message to the sleep request message before the retransmission count is exhausted, i.e., if every retransmission of the sleep request message is failed (S2605), the mobile station deactivates the currently activated power saving class (S2606). The mobile station transmits the sleep request message to the base station to activate PSC2 (S2607), and the base station which has received the sleep request message activates PSC2, and transmits the sleep response message to the mobile station (S2608).

Figure 27:
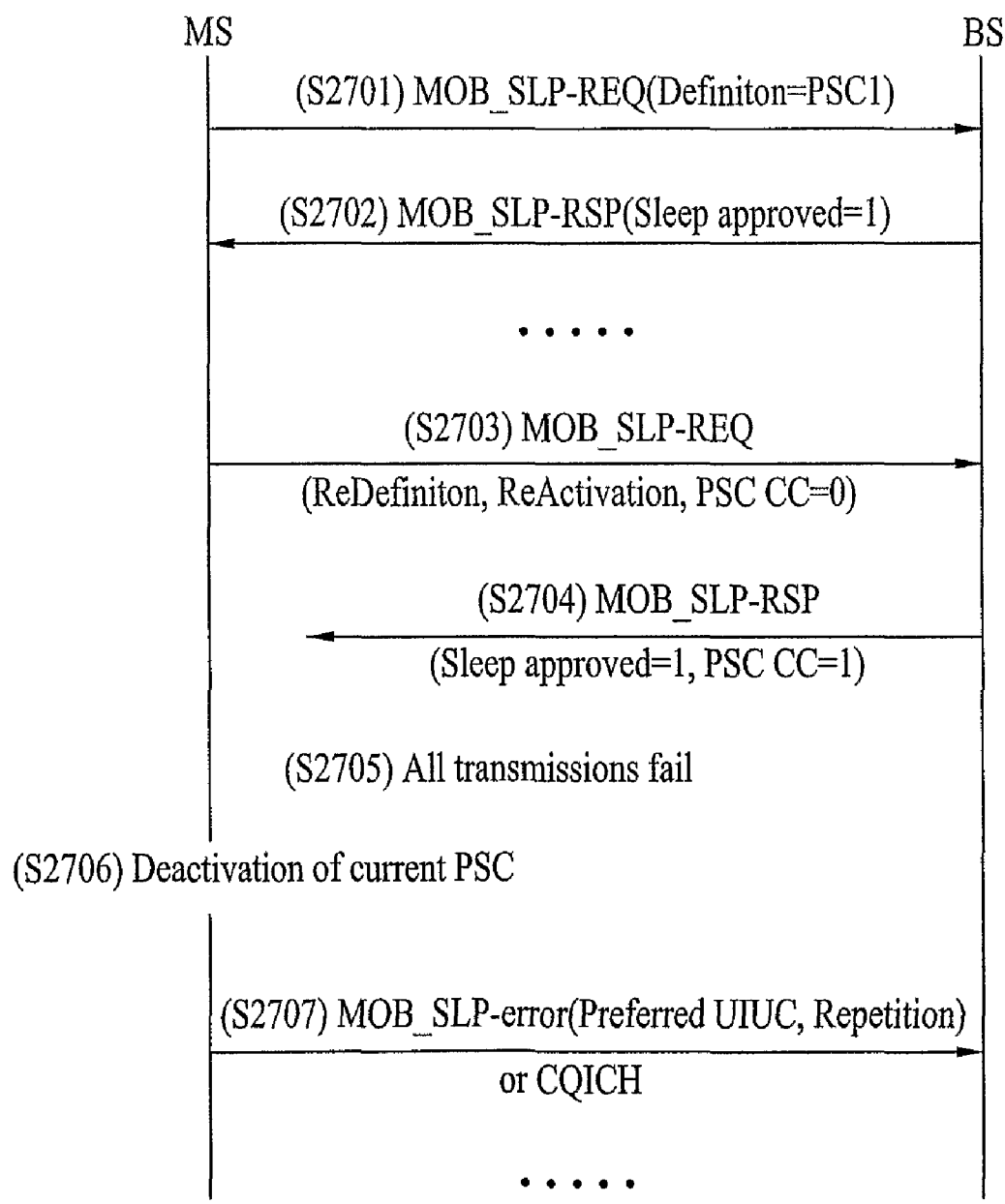

FIG. 27 illustrates another embodiment suggested in the present invention to solve the synchronization problem of the sleep mode between the mobile station and the base station.

The mobile station transmits the sleep request message to the base station to define the PSC (S2701). The base station which has received the sleep request message transmits the sleep response message to the mobile station (S2702), and the mobile station is operated in the sleep mode by using the defined PSC. The mobile station transmits the sleep request message to the base station to redefine and reactivate the PSC (S2703). The base station which has received the sleep request message updates related parameters and then operates the sleep mode by using the updated PSC. Afterwards, the base station transmits the sleep response message to the mobile station but the mobile station does not receive the message due to channel deterioration (S2704). The mobile station which has not received the sleep response message retransmits the sleep request message to the base station. If the mobile station does not receive the sleep response message to the sleep request message before the retransmission count is exhausted, i.e., if every retransmission of the sleep request message is failed (S2705), the mobile station deactivates the currently activated power saving class (S2706). The mobile station allows the base station to receive a right MCS level with respect to downlink transmission by transmitting the status of the current channel to the base station through CQICH or transmitting a sleep error message (MOB_SLP-ERROR) to the base station, wherein the sleep error message includes desired DIUC information and repetition information (S2707).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the mobile station. In this case, the base station means a terminal node of a network which directly performs communication with the mobile station. A specific operation which has been described as being performed by the base station may be performed by an upper node of the base station as the case may be. In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as user equipment and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method of transmitting a message associated with a sleep mode in a broadband wireless access system, the method comprising:
    receiving, when a value of a latency between a point of an uplink resource allocation during a listening interval and a point to generate at least one packet at a mobile station in the sleep mode is greater than a predetermined threshold value, a header message related to resource allocation from the mobile station,
    wherein the header message includes latency related information comprising the value of the latency;
    transmitting sleep response message (MOB_SLP-RSP) in response to the header message,
    wherein the MOB_SLP-RSP includes an offset value determined based on the latency related information, and
    wherein the offset value indicates a changed start point of the listening interval in the sleep mode; and
    receiving a sleep acknowledgement message (SLP-ACK) from the mobile station which has received the sleep response message.

2. The method of claim 1, wherein the generated at least one packet is a voice over Internet protocol (VoIP) packet.

3. The method of claim 1, wherein the header message related to resource allocation is a grant management subheader for resource allocation.

4. The method of claim 1, wherein the MOB_SLP-RSP defines at least one parameter associated with the sleep mode.

* * * * *